United States Patent
Yang et al.

(10) Patent No.: US 11,811,359 B2
(45) Date of Patent: Nov. 7, 2023

(54) SOLAR MODULE MOUNTING SYSTEM

(71) Applicant: PanelClaw, Inc., North Andover, MA (US)

(72) Inventors: Hanghai Yang, Andover, MA (US); Joseph Armano, Andover, MA (US); Vasilije Jovanovic, North Andover, MA (US); John De Papp, North Andover, MA (US)

(73) Assignee: PanelClaw, Inc., North Andover, MA (US)

( * ) Notice: Subject to any disclaimer, the term of this patent is extended or adjusted under 35 U.S.C. 154(b) by 0 days.

(21) Appl. No.: 17/962,154

(22) Filed: Oct. 7, 2022

(65) Prior Publication Data
US 2023/0036926 A1    Feb. 2, 2023

Related U.S. Application Data

(63) Continuation of application No. 17/181,375, filed on Feb. 22, 2021, now Pat. No. 11,476,797, which is a
(Continued)

(51) Int. Cl.
*H02S 30/10* (2014.01)
*F16M 13/02* (2006.01)
(Continued)

(52) U.S. Cl.
CPC .......... *H02S 30/10* (2014.12); *F16M 13/022* (2013.01); *F24S 25/634* (2018.05); *H02S 20/10* (2014.12);
(Continued)

(58) Field of Classification Search
None
See application file for complete search history.

(56) References Cited

U.S. PATENT DOCUMENTS 2,619,138 A    11/1952 Marler
4,226,256 A    10/1980 Hawley
(Continued)

FOREIGN PATENT DOCUMENTS

DE    102012105053 B1    12/2013
DE    102016007488 A1    12/2017
(Continued)

OTHER PUBLICATIONS

B. Sienkiewicz and R.N. Meroney: "Wind Effects on Roof Ballast Pavers" Journal of Structural Division, American Society of Civil Engineering. Revised Sep. 1986 and again Jun. 1987 (34 pages).
(Continued)

*Primary Examiner* — Steven M Marsh
(74) *Attorney, Agent, or Firm* — THE WEBB LAW FIRM

(57) ABSTRACT

Systems and methods for mounting one or more framed solar modules are disclosed. A solar module mounting system can include a plurality of support members configured to support one or more framed solar modules above a mounting surface, such as the ground or the roof of a building. The support members can include rails formed from a rigid material, such as steel. The solar module mounting system can also include a plurality of attachment mechanisms each configured to secure a portion of a framed solar module to a portion of a respective one of the support members.

20 Claims, 18 Drawing Sheets

Related U.S. Application Data continuation of application No. 16/249,708, filed on Jan. 16, 2019, now Pat. No. 10,931,225.

(60) Provisional application No. 62/618,407, filed on Jan. 17, 2018.

(51) Int. Cl.
    *H02S 20/23*     (2014.01)
    *H02S 20/10*     (2014.01)
    *F24S 25/634*     (2018.01)
    *F24S 25/60*     (2018.01)

(52) U.S. Cl.
CPC ....... *H02S 20/23* (2014.12); *F24S 2025/6003* (2018.05); *F24S 2025/6008* (2018.05)

(56) References Cited

U.S. PATENT DOCUMENTS

| | | |
|---|---|---|
| 4,966,631 A | 10/1990 | Matlin et al. |
| 5,125,608 A | 6/1992 | McMaster et al. |
| 5,143,556 A | 9/1992 | Matlin |
| 5,228,924 A | 7/1993 | Barker et al. |
| 5,732,921 A | 3/1998 | Lemire |
| 9,553,544 B2 | 1/2017 | Nayar |
| 10,243,505 B1 | 3/2019 | Kurtz et al. |
| 10,256,767 B1 | 4/2019 | Sinai et al. |
| 10,707,803 B2 | 7/2020 | Pretorius et al. |
| 2008/0136077 A1* | 6/2008 | Yang .................. B25B 5/127 269/6 |
| 2010/0147359 A1 | 6/2010 | Harberts et al. |
| 2011/0024582 A1 | 2/2011 | Gies et al. |
| 2012/0048351 A1* | 3/2012 | Rizzo .................. F24S 25/16 136/251 |
| 2012/0201601 A1* | 8/2012 | Rizzo .................. F24S 25/632 403/409.1 |
| 2012/0267328 A1* | 10/2012 | McPheeters ............ F24S 25/65 211/41.1 |
| 2013/0102165 A1* | 4/2013 | DuPont .................. H02S 20/22 439/95 |
| 2013/0139870 A1 | 6/2013 | Nuernberger et al. |
| 2013/0291472 A1 | 11/2013 | Sader |
| 2013/0291479 A1 | 11/2013 | Schaefer et al. |
| 2014/0102517 A1 | 4/2014 | Meine et al. |
| 2014/0102996 A1* | 4/2014 | Pelman ................ F24S 25/615 211/41.1 |
| 2014/0332059 A1 | 11/2014 | Shea et al. |
| 2014/0360111 A1* | 12/2014 | Kuan .................. F24S 25/13 52/173.3 |
| 2015/0075589 A1 | 3/2015 | West et al. |
| 2015/0144580 A1 | 5/2015 | Kitano et al. |
| 2015/0372635 A1* | 12/2015 | Praca .................. F24S 25/634 52/745.19 |
| 2016/0282018 A1* | 9/2016 | Ash ...................... F24S 25/636 |
| 2017/0302222 A1* | 10/2017 | Aliabadi ................ F24S 25/65 |
| 2017/0310275 A1 | 10/2017 | Owen et al. |
| 2017/0366131 A1 | 12/2017 | Stearns et al. |
| 2018/0342974 A1 | 11/2018 | Jasmin et al. |

FOREIGN PATENT DOCUMENTS

| | | |
|---|---|---|
| EP | 0344523 B2 | 12/1989 |
| EP | 2080965 A2 | 7/2009 |
| FR | 2950956 A1 | 4/2008 |
| WO | 9400650 | 1/1994 |

OTHER PUBLICATIONS

Bhaduri, S. and Murphy, L.M.: "Wind Loading on Solar Collectors" prepared for the U.S. Dept. of Energy for contract No. DE-AC02-83CH10093, Golden, CO., Jun. 1985 (50 pages).

Chevalier, H.L. and Norton, D.J.: "Wind Loads on Solar Collector Panels and Support Structure" sponsored by the U.S. Dept. of Energy contract No. EV-76-S-05-5130, Oct. 1979 (98 pages).

Cochran, Leighton S., "Influence of Porosity on the Mean and Peak Wind Loads for Three Concentrator Photovoltaic Arrays" Colorado State University, Fort Collins, CO 1986 (14 pages).

Delmarva Power and Light Co.: Development of a Dispatchable PV Peak Shaving System; Prepared for the US Dept of Energy Cooperative Agreement No. DE-FC-93CHI0569. Oct. 1995 (77 pages).

Farrington, Robert and Kiss Cathcart Anders Architects, P.C.: Building Integrated Photovoltaics from the National Renewable Energy Laboratory for the U.S. Dept. of Energy under Contract No. DE-AC36-83CH10093, Jan. 1993 (64 pages).

Frantzis, Lisa, et al.:Building-Integrated Photovoltaics (BIPV) Analysis and US Market Potential for Building Equipment Div., US Dept of Energy Contract No. DE-AC01-90CE23821 Feb. 1995 (176 pages).

Fuentes, Martin: "Simplified Thermal Model for Flat-Plate Photovoltaic Arrays" Prepared by Sandia National Laboratories, Albuquerque, NM, May 1987 (60 pages).

Hersch, Paul; Strawn, Noni; Piekarski, Dick; Cook, Gary: "Photovoltaics for Residential Applications" Technical Information Branch, Solar Energy Research Institute, published Feb. 1984 (23 pages).

Kern, Dr. Edward C. Jr., Ascension Technology: "Low-Cost PV Array Mounting for Flat-roof Buildings" from the Third International Workshop on Photovoltaics in Buildings, Lincoln Center, MA (3 pages).

Kern, Edward C. Jr. and Russell, Miles C.: Array Designs for Flat-Roof Buildings; Retrieved from the Internet, 1993.

Kern, Edward C., Jr. and Russell, Miles C.: Rotating Shadow Band Pyranometer Irradiance Monitoring for Photovoltaic Generation Estimation from the 22nd IEEE Photovoltaic Specialists Conference— 1991 vol. 1, Las Vegas, NV (7 pages).

Murphy, L.M.: "Wind Loading on Tracking and Field Mounted Solar Collectors", prepared by Solar Energy Research Institute, Golden, CO. for the U.S. Dept. of Energy, Dec. 1980 (10 pages).

Peterka, J.A., Sinou, J.M., and Cermak, J.E.: "Mean Wind Forces on Parabolic-Trough Solar Collectors" prepared for Sandia National Laboratories under Contract No. 13-2412, May 1980 (121 pages).

PV Specifications retrieved from the internet by Greg Pearen, Mar. 23, 2001 (11 pages).

Radu, Adrian; Axinte, Elena; and Theohari, Christina: "Steady Wind Pressures on Solar Collectors on Flat-Roofed Buildings" Journal of Wind Engineering and Industrial Aerodynamics, 23 (1986) 249-258 Elevator Science Publishers B.B., Amsterdam (10 pages).

Russell, M.C.: Solar Photovoltaic Systems for Residences in the Northeast, Lexington, MA, 1980 (7 pages).

Russell, Miles C. and Kern, Edward C. Jr.: "Stand-Off Building Block Systems for Roof-Mounted Photovoltaic Arrays Sandia Contract" 58-8796. Retrieved through Wisconsin Tech Search. Jun. 1986 (212 pages).

Siemens Solar Electric Modules Installation Guide, 1990 (8 pages).

Stafford, Byron: "Design Considerations and Performance of Maspeth a-Si PV System" American Institute of Physics, 1994 (8 pages).

Stiebel Eltron GmbH & Co.: KG: "Mount for the installment of Solar Panels" retrieved from German Patent Office, published Aug. 26, 1982 (9 pages).

Technical Information Branch, Solar Energy Research Institute: "Photovoltaics for Residential Applications" operated for the U.S. Dept. of Energy by Midwest Research Institute, Golden, CO, Feb. 1984 (23 pages).

Tieleman, H.W. et al.: "An Investigation of Wind Loads on Solar Collectors" prepared for the U.S. Dept. of Commerce National Bureau of Standards for contract No. EO-A01-78-3605, Jan. 1980 (173 pages).

Toggweiler, Peter, et. al.: Development of a flat-roof integrated photovoltaic system (SOFREL) Zurich, Switzerland, Mar. 1994 (189 pages).

* cited by examiner

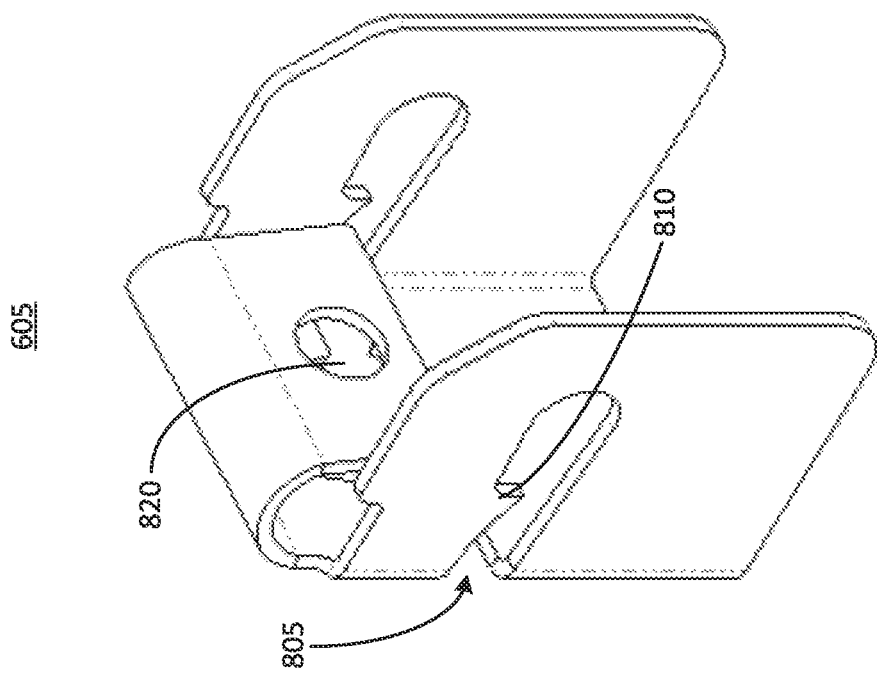
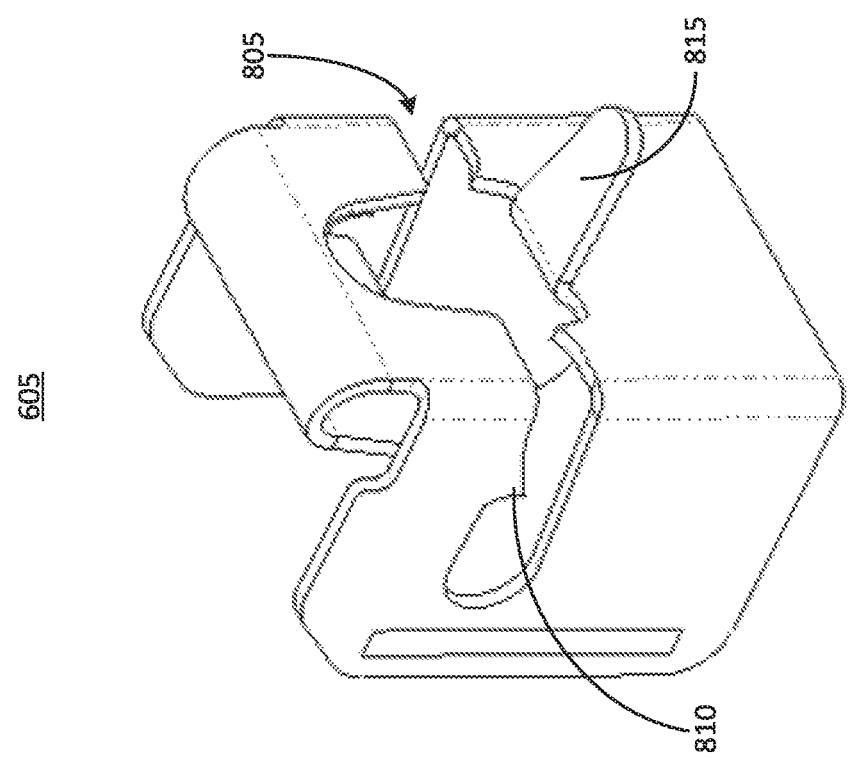
FIG. 8B
FIG. 8A

SOLAR MODULE MOUNTING SYSTEM

CROSS-REFERENCE TO RELATED APPLICATIONS

This application is a continuation of U.S. patent application Ser. No. 17/181,375, filed on Feb. 22, 2021, entitled "Solar Module Mounting System", and now U.S. Pat. No. 11,476,797, which is a continuation of U.S. patent application Ser. No. 16/249,708, filed Jan. 16, 2019, entitled "Solar Module Mounting System", and now U.S. Pat. No. 10,931,225, which claims priority to U.S. Provisional Patent Application No. 62/618,407, filed on Jan. 17, 2018 and entitled "Solar Module Mounting System", the disclosures of which are hereby incorporated by reference in their entireties.

BACKGROUND

Solar (photovoltaic) modules are often manufactured in the form of flat rigid plates. To facilitate the performance of the function of generating electricity, solar modules may be mounted in an area exposed to the sun or other source of light. Often, solar modules are mounted at an angle from the horizontal so that they will more directly face the sun during peak daylight. In some applications, a number of solar modules are mounted together in an array in order to combine the power generation capabilities of the individual solar modules. Mounting systems for solar module arrays retain the solar modules in place by attaching the solar modules to one another and/or by attaching the solar modules to the mounting structure.

SUMMARY OF THE DISCLOSURE

Aspects and implementations of the present disclosure are directed to systems and methods for mounting solar modules. A solar module mounting system can include a plurality of support members configured to support one or more solar modules above a mounting surface, such as the ground or the roof of a building. The support members can include rails formed from a rigid material, such as steel or aluminum. The solar module mounting system can also include a plurality of attachment mechanisms each configured to secure a portion of a solar module to a portion of a respective one of the support members.

In some implementations, the attachment mechanisms can be designed such that a technician can install or remove a solar module from the system without the use of specialized tools. In some implementations, the attachment mechanisms can be designed such that a technician can install or remove a solar module from the system without the use of any tools at all, resulting in a tool-less assembly for the system. This approach can improve the speed and ease with which a solar module installation can be carried out. In some implementations, parameters of the design of the solar module mounting system can be easily modified to achieve a desired tilt angle for the solar modules supported by the system. The solar module mounting system can also allow for grounding and bonding of electrical components included in the solar modules to improve safety and reliability. Thus, the simplified systems and solar module mounting techniques described in this disclosure can reduce cost and complexity while providing sufficient structural strength to support a plurality of solar modules in a fixed location.

At least one aspect of this disclosure is directed to an attachment mechanism for securing a framed solar module to a support structure. The attachment mechanism can include a support member extending along a mounting surface. The support member can form a portion of the support structure. The attachment mechanism can include a bracket coupled with the support member. The attachment mechanism can include a seat coupled with the bracket. The seat can be configured to support at least a portion of the framed solar module. The seat can include a seat surface. The attachment mechanism can also include a clip having an opening configured to receive the seat surface and a flange of the framed solar module to secure the framed solar module between the seat surface and the clip.

In some implementations, the opening of the clip can define a pair of opposing clip surfaces. A first clip surface of the pair of clip surfaces can be configured to contact the flange of the framed solar module. In some implementations, a second clip surface of the pair of clip surfaces can be configured to contact the seat surface. In some implementations, the seat surface can include a first serration pattern. The second clip surface can include a second serration pattern configured to engage with the first serration pattern of the seat surface. In some implementations, the opposing clip surfaces may not be parallel with one another.

In some implementations, the attachment mechanism can include a hinge configured to couple the seat with the bracket. The seat can be configured to rotate about the hinge within the bracket. In some implementations, the bracket can further include a bracket surface configured to support at least a portion of the framed solar module. The bracket surface can be sloped at a predetermined tilt angle with respect to the mounting surface. In some implementations, the bracket can further include a plurality of bracket flanges extending away from the bracket surface and configured to exert a force on the flange of the framed solar module.

In some implementations, the bracket can further include a plurality of feet projecting outwards from the bracket. The plurality of feet can be configured to prevent rotation of the bracket with respect to the support member. In some implementations, a length of the support member can be selected based on a desired tilt angle of the framed solar module. In some implementations, the support member, the seat, the bracket, and the clip can be formed from one or more electrically conductive materials to form a grounding path between the framed solar module and the support member.

At least another aspect of this disclosure is directed to an attachment mechanism for securing a framed solar module to a support structure. The attachment mechanism can include a support member extending away from a mounting surface. The support member forming a portion of the support structure. The support member can include a first slot configured to receive a flange of the framed solar module. The attachment mechanism can include a bracket coupled with the support member. The bracket can include a second slot aligned with the first slot of the support member and configured to receive the flange of the framed solar module. The bracket can include a plurality of locking teeth extending into the second slot of the bracket. The plurality of teeth can be configured to engage with the flange of the framed solar module to secure the framed solar module within the first slot of the support member and the second slot of the bracket.

In some implementations, the attachment mechanism can include a first hole formed through the support member. The attachment mechanism can include a second hole formed through the bracket and aligned with the first hole formed through the support member. The attachment mechanism can also include a mechanical fastener inserted through the first hole and the second hole to couple the bracket to the support member.

In some implementations, the bracket can be configured to rotate with respect to the support member into at least two rotational positions, including a first rotational position in which the plurality of locking teeth do not engage with the flange of the framed solar module when the flange of the framed solar module is inserted into the first slot of the support member, and a second rotational position in which the plurality of locking teeth engage with the flange of the framed solar module.

In some implementations, the bracket can include a locator tongue projecting outward from the second slot of the bracket. The locator tongue can be configured to support at least a portion of the framed solar module during installation or removal of the framed solar module. In some implementations, the bracket can include a plurality of edges positioned between the flange of the framed solar module and a backsheet of the framed solar module, at least one of the plurality of edges having a rounded shape.

In some implementations, a length of the support member can be selected based on a desired tilt angle of the framed solar module. In some implementations, the support member and the bracket are formed from one or more electrically conductive materials to form a grounding path between the framed solar module and the support member.

At least another aspect of this disclosure is directed to a system for supporting a framed solar module above a mounting surface. The system can include a first support member extending along a mounting surface. The system can include a second support member coupled with the first support member and extending away from the mounting surface. The first support member and the second support member can form a support structure to support the framed solar module. The system can include a first ballast rail extending in a direction parallel to the mounting surface and perpendicular to a direction of the first support member. The first ballast rail can include a first ballast support surface and a first sidewall coupled with the first ballast support surface. The first ballast support surface can be configured to support a first side of a ballast block. The system can also include a second ballast rail opposed to the first ballast rail and extending parallel to the first ballast rail. The second ballast rail can include a second ballast support surface and a second sidewall coupled with the second ballast support surface. The second ballast support surface can be configured to support a second side of the ballast block opposite the first side of the ballast block.

In some implementations, the first ballast support surface of the first ballast rail can be spaced away from the second ballast support surface of the second ballast rail. In some implementations, the system can also include a third ballast rail extending parallel to the first ballast rail. The third ballast rail can include a third ballast support surface that overlaps at least a portion of the first ballast support surface of the first ballast rail and a third sidewall that overlaps at least a portion of the first sidewall of the first ballast rail. In some implementations, the first ballast rail can include a first interlocking feature that is configured to interlock with a second interlocking feature of the third ballast rail. In some implementations, the system can also include a mechanical fastener that couples the first ballast rail and the third ballast rail with the first support member.

In some implementations, the first ballast rail and the second ballast rail can be positioned beneath the framed solar panel module. In some implementations, the first ballast rail can include a security tab configured to prevent the ballast block from sliding off of the first ballast supporting surface.

At least another aspect of this disclosure is directed to a system for supporting a framed solar module above a mounting surface. The system can include a first support member extending along a mounting surface. The system can include a first attachment mechanism. The first attachment mechanism can include a first bracket coupled with the first support member. The first attachment mechanism can include a seat coupled with the first bracket, the seat configured to support at least a portion of the framed solar module, the seat comprising a seat surface. The first attachment mechanism can include a clip having an opening configured to receive the seat surface and a first flange of the framed solar module to secure the framed solar module between the seat surface and the clip. The system can include a second support member coupled with the first support member and extending away from the mounting surface. The second support member can include a first slot configured to receive a second flange of the framed solar module. The system can also include a second attachment mechanism. The second attachment mechanism can include a second bracket coupled with the second support member. The second bracket can include a second slot aligned with the first slot of the second support member and configured to receive the second flange of the framed solar module. The second bracket can also include a plurality of locking teeth extending into the second slot of the second bracket. The plurality of teeth can be configured to engage with the second flange of the framed solar module to secure the framed solar module within the first slot of the second support member and the second slot of the second bracket.

In some implementations, the first attachment mechanism can be coupled with a first side of the framed solar module. In some implementations, the second attachment mechanism can be coupled with a second side of framed solar module, opposite the first side.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIGS. 8A and 8B show various views of a bracket included in the high-side attachment mechanism of FIGS. 6A and 6B, according to an illustrative implementation.

DETAILED DESCRIPTION

Following below are more detailed descriptions of various concepts related to, and implementations of, systems and methods for mounting solar modules. The various concepts introduced above and discussed in greater detail below may be implemented in any of numerous ways, as the described concepts are not limited to any particular manner of implementation. Examples of specific implementations and applications are provided primarily for illustrative purposes.

Figure 1A:
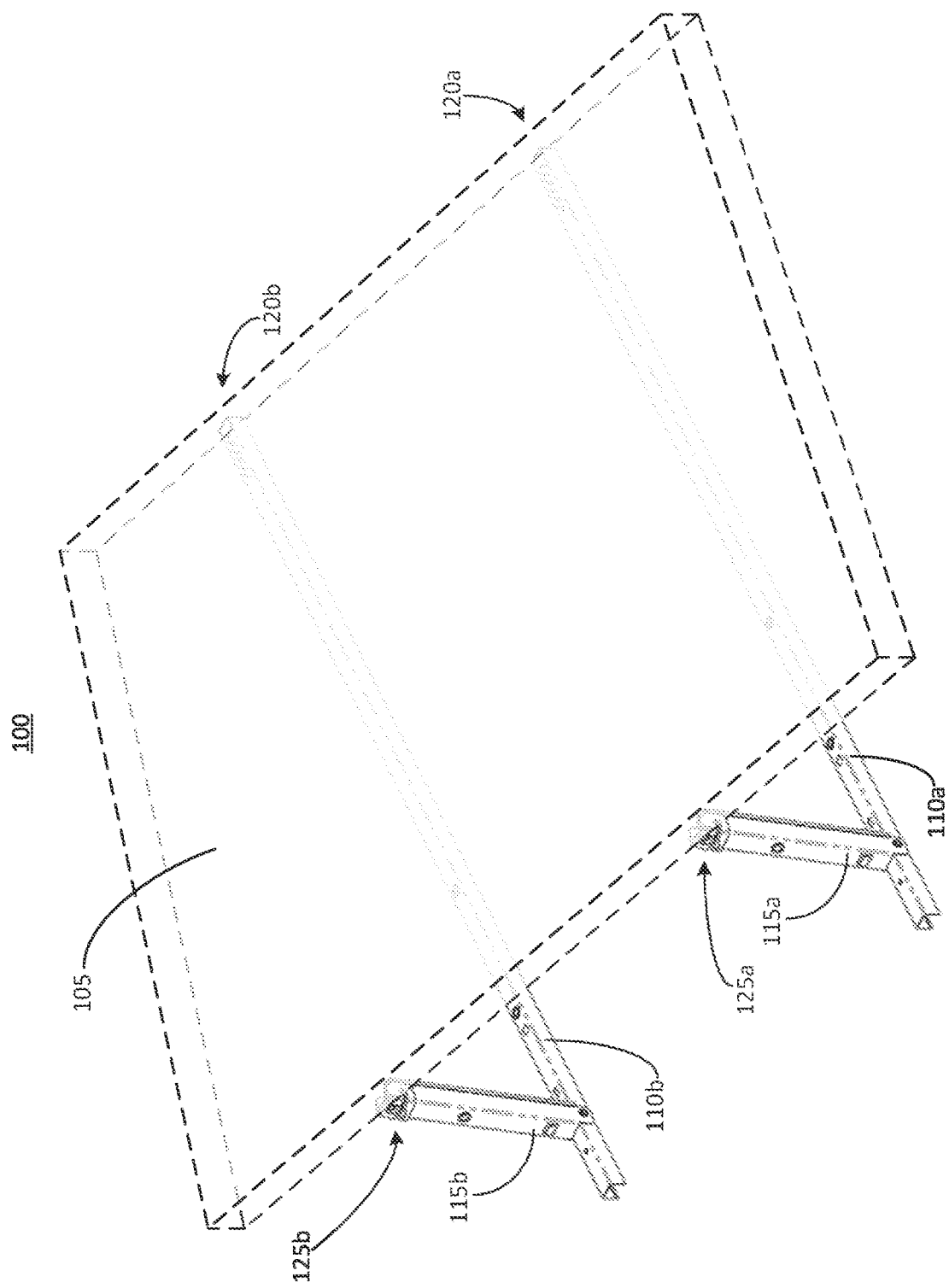
FIG. 1A is a perspective view of a system for mounting one or more framed solar modules including a high-side attachment mechanism, according to an illustrative implementation.
Figure 1B:
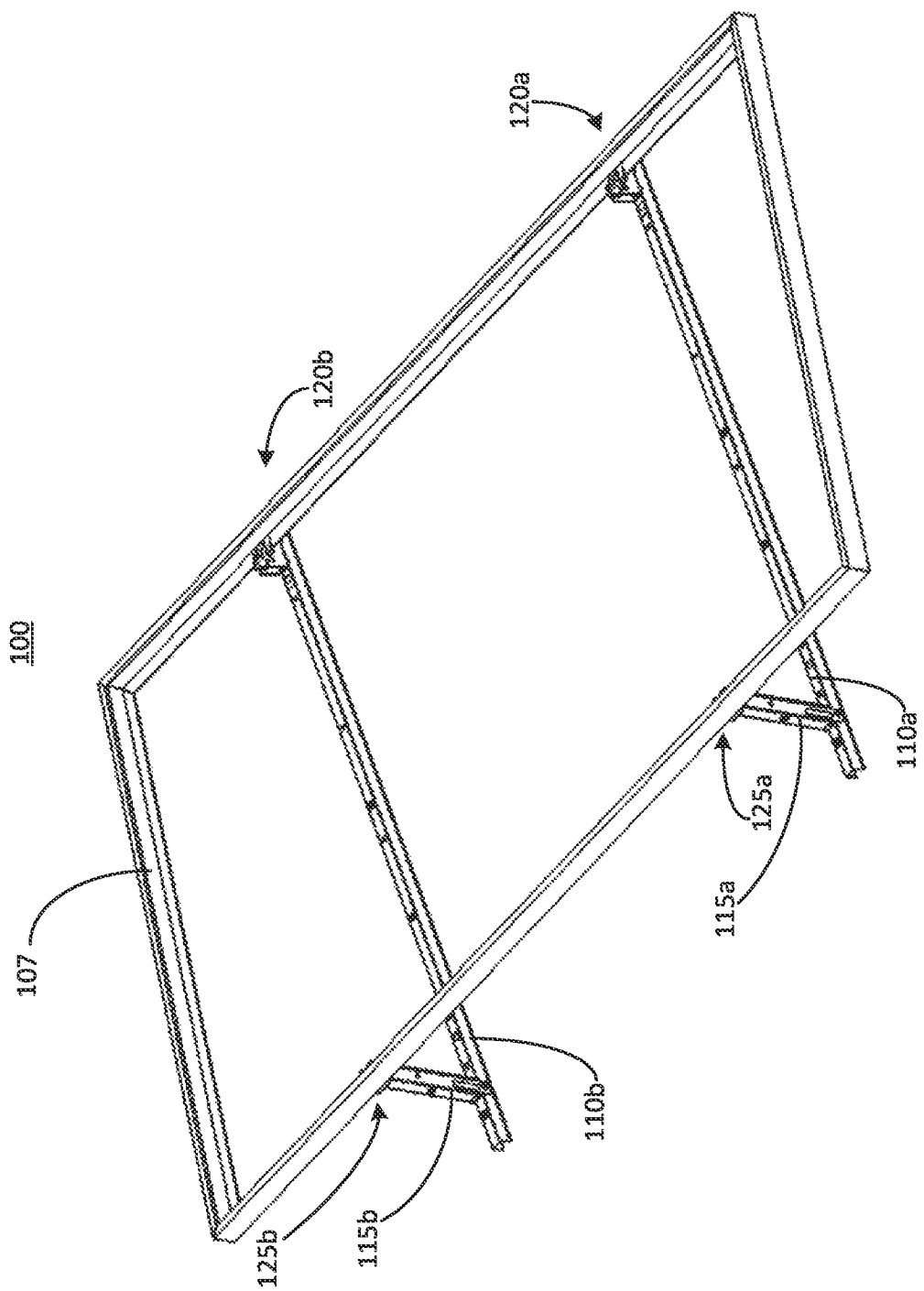
FIG. 1B is a perspective view of the system of FIG. 1A with the solar module removed from the frame, according to an illustrative implementation.
Figure 1C:
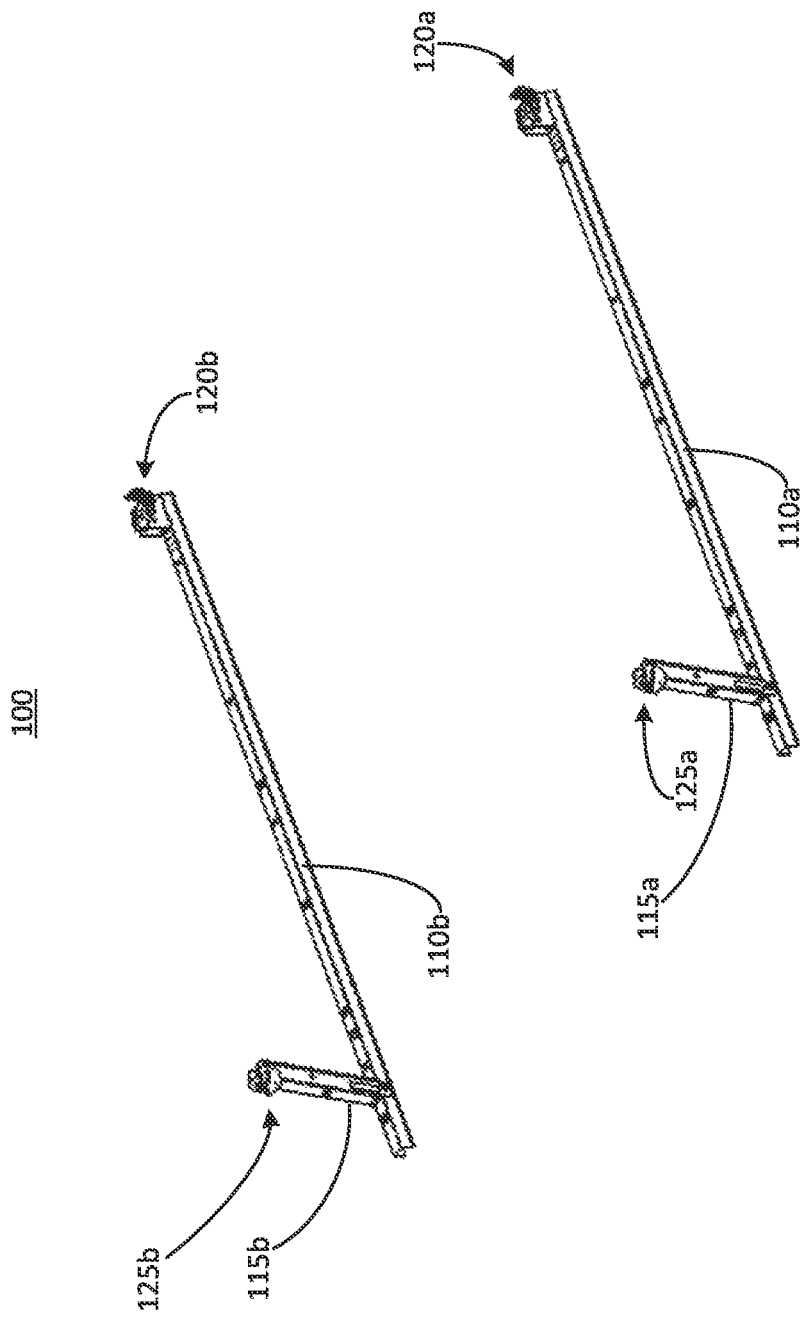
FIG. 1C is a perspective view of the system of FIG. 1A with the frame and the solar module removed from the system, according to an illustrative implementation.

FIG. 1A is a perspective view of a system 100 for mounting one or more framed solar modules, such as the solar module 105, according to an illustrative implementation. FIG. 1B is a perspective view of the system 100 of FIG. 1A with the solar module 105 removed, so that only the frame 107 is visible for illustrative purposes. FIG. 1C is a perspective view of the system 100 of FIG. 1A with both the frame and the solar module removed for illustrative purposes. Referring now to FIGS. 1A-1C, the system 100 can be configured to be mounted on a substantially flat mounting surface, such as a roof or the ground. The system 100 includes one solar module 105, which is depicted as partially transparent in FIG. 1A for illustrative purposes. The solar module 105 can be surrounded by or housed within the frame 107. It should be understood that, while only a single solar module 105 and frame 107 are shown, in various other implementations, the system 100 may include any number of solar modules 105, each of which may be housed within a respective frame 107.

The system 100 also includes two first support members 110a and 110b (generally referred to as first support members 110) and two second support members 115a and 115b (generally referred to as second support members 115). The first support members 110 can lie substantially flat along the planar mounting surface. Each second support member 115 couples to a respective first support member 110 and extends in a direction away from the mounting surface. The relative lengths and angles of the first support members 110 and the second support members 115 can be selected to create a desired tilt angle for the solar module 105, with respect to the mounting surface. For example, selecting the lengths of the first support members 110 to be relatively longer can result in a shallower tilt angle, while selecting the second support members 115 to be relatively longer can result in a steeper tilt angle.

The first support member 110a supports the solar module 105 at an attachment point 120a. The first support member 110b supports the solar module 105 at an attachment point 120b. The second support member 115a supports the solar module 105 at an attachment point 125a. The second support member 115b supports the solar module 105 at an attachment point 125b. An attachment mechanism can be positioned at each of the attachment points 120 and 125. Generally, the attachment mechanism positioned at each of the attachment points 120 can be referred to as a low-side attachment mechanism, and the attachment mechanism positioned at each of the attachment points 120b can be referred to as a high-side attachment mechanism. Some of the details of these attachment mechanisms are not illustrated in FIGS. 1A-1C for clarity, but are shown in other figures described further below. For example, the low-side attachment mechanism is shown and described in connection with FIGS. 2A-2D, FIGS. 3A and 3B, FIGS. 4A-4C, and FIGS. 5A and 5B. The high-side attachment mechanism is depicted at the attachment points 125, and is further shown and described in connection with FIGS. 6A and 6B, FIG. 7, and FIGS. 8A and 8B.

It should be understood that the arrangement of the components of the system 100 as they are shown in FIG. 1A are illustrative only, and that other arrangements could also be used. For example, the system 100 could include an additional first support member 110 and a respective additional second member 115 to support the solar module 105 and the frame 107, such that the solar module 105 would be supported at six attachment points. In some implementations, additional first support members 110 and second support members 115 may be arranged in rows and columns and configured to support a rectangular array of solar modules 105, which could include tens, hundreds, or thousands of solar modules 105, without departing from the scope of this disclosure. In implementations in which the system 100 includes more solar modules 105 arranged in an array, the solar modules 105 may be mounted at different angles and different orientations throughout the array. For example, in some implementations, the solar modules 105 can be mounted in a dual tilt configuration in which a first set of the solar modules 105 are tilted in a first direction and a second set of solar modules 105 are tilted in a second direction substantially opposite the first direction. In other implementations, the solar modules 105 may be mounted uniformly throughout such an array. The system 100 of FIGS. 1A-1C is shown in a configuration selected to mount the solar module 105 at an angle from the horizontal (i.e., an angle from the plane of the mounting surface), but in some embodiments, the solar module 105 may be mounted at angles other than that illustrated in FIGS. 1A-1C, or it may be mounted horizontally (e.g., an angle of zero degrees with respect to the mounting surface).

FIGS. 2A-2D show various views of a low-side attachment mechanism 200 that can be used in the system 100 of FIGS. 1A-1C, according to an illustrative implementation. In some implementations, the low-side attachment mechanism 200 can be used to secure the solar module 105 at either of the attachment points 120 shown in FIGS. 1A-1C. Stated another way, the low-side attachment mechanism 200 can be used to secure the solar module 105 to an end of each first support member 110. The low-side attachment mechanism 200 includes a clip 210, a seat 215, and a bracket 220.

Figure 2A:
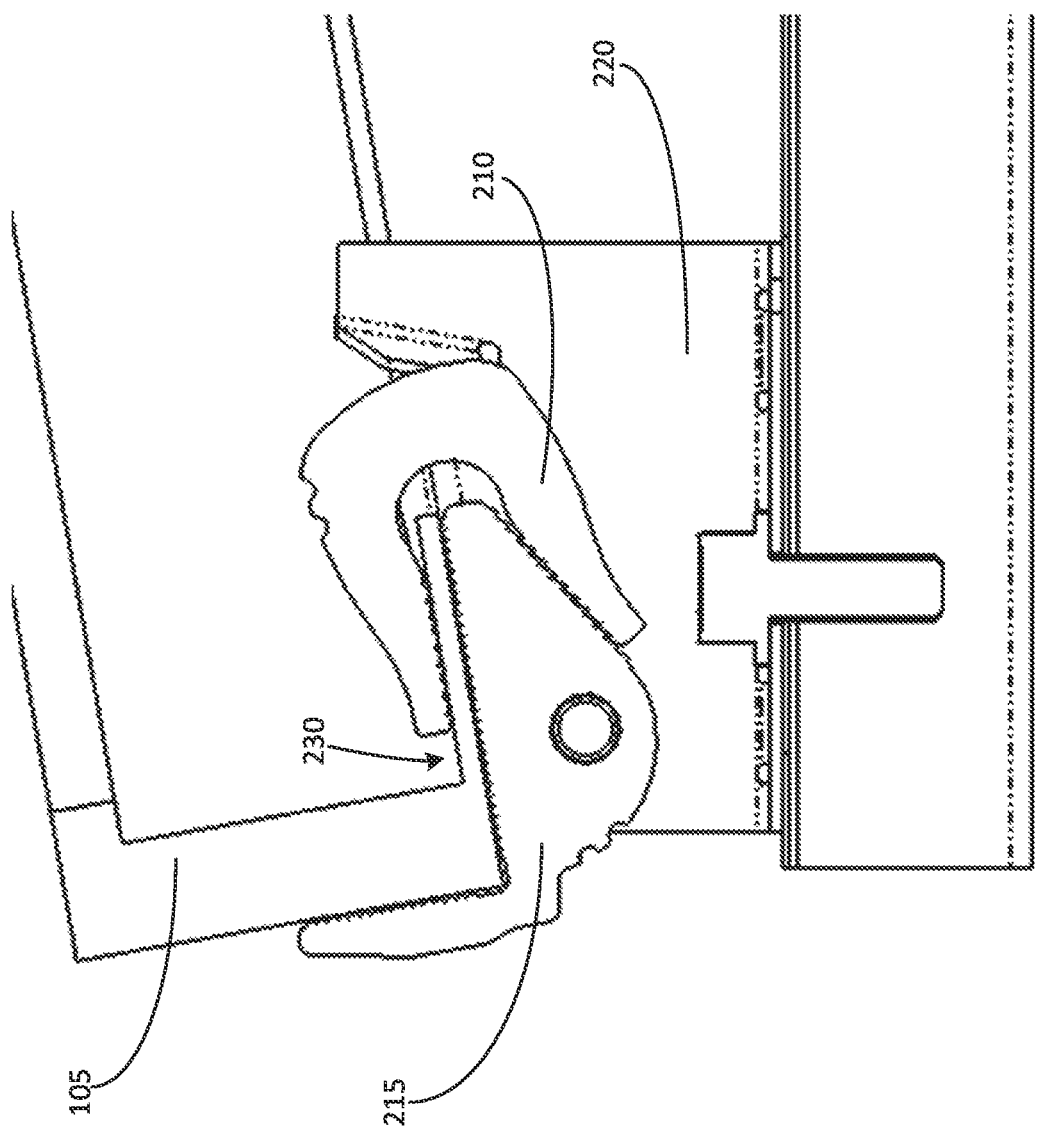
FIGS. 2A-2D show various views of a low-side attachment mechanism that can be used in the system of FIGS. 1A-1C, according to an illustrative implementation.

As shown in the view of FIG. 2A, when installed, a flange 230 of the solar module 105 is secured between the clip 210 and the seat 215 and bracket 220. In some implementations, the flange 230 may instead be a flange of the frame 107, rather than a flange of the solar module 105. In some implementations, the low-side attachment mechanism 200 can be configured to accommodate a wide range of sizes for the flange 230. For example, the clip 210 can be positioned farther down the seat 215 to accommodate a narrower flange 230, or can be positioned farther up the seat 215 to accommodate a wider flange 230. Thus, the low-side attachment mechanism 200 can be used to secure a variety of types or sizes of solar modules 105 to a support member, such as the first support members 110.

In some implementations, the components of the low-side attachment mechanism 200 can be formed from electrically conductive materials. Such an arrangement can help to facilitate electrical bonding of the components as well as grounding of the solar module 105. For example, when the solar module 105 is installed in the low-side attachment mechanism 200, an electrical path can exist between the solar module 105, the clip 210, the seat 215, and the bracket 220. In some implementations, a grounding wire can couple at least one of these components (e.g., the bracket 220) to ground. In some other implementations, an electrical connection also can exist between the bracket 220 and the first support member to which the bracket 220 is fixed. The first support member can in turn be electrically connected to ground. In some implementations, the materials chosen to form the components of the low-side attachment mechanism 200 can also be selected to have sufficient structural strength to support the weight of the solar module 105, as well as any pressure that may be exerted on the solar module 105, for example due to wind, snow, or seismic acceleration. In some implementations, the clip 210, the seat 215, and the bracket 220 can be formed from a conductive and structurally strong material, such as steel or aluminum.

Figure 2B:
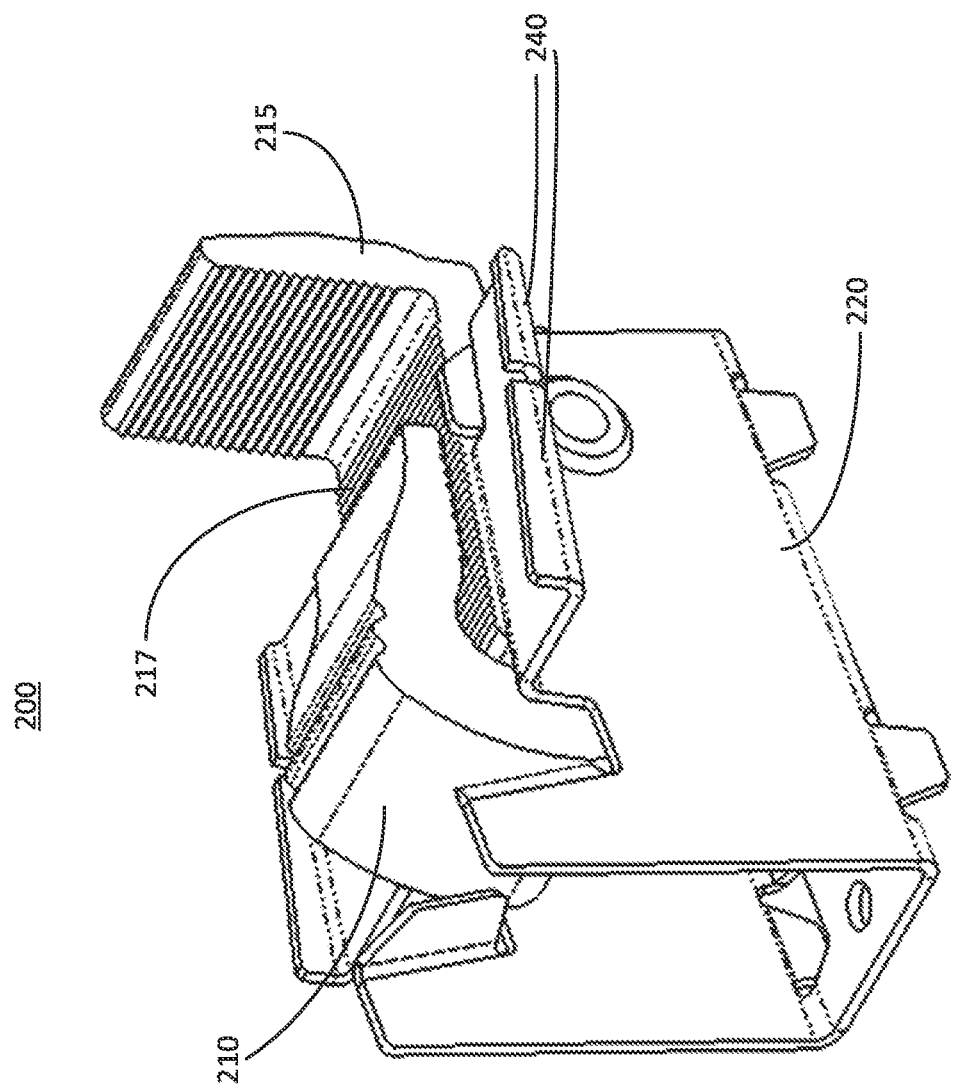

Referring now to FIG. 2B, the low-side attachment mechanism 200 is illustrated without the solar module 105. As shown in this view, the bracket 220 is configured to receive the seat 215. The bracket 220 also includes flanges 240. Upper edges of the flanges 240 are positioned above an upper edge of the bracket 220. As a result, when the solar module 105 is installed, the solar module flange 230 can press against the bracket flanges 240. In some implementations, the flanges 240 can be configured to deform in response to pressure from the solar module 105. As a result, the flanges 240 may press against or dig into the solar module 105. Thus, the flanges 240 can serve to support a portion of the weight of the solar module 105, as well as to provide additional surface area in contact with the solar module 105, thereby improving an electrical connection between the solar module 105 and the bracket 220. The flanges 240 apply a constant force, sometimes referred to as a preload, to the solar module flange 230 such that the solar module 105 does not move as a result of any forces applied to the solar module 105, such as those caused by wind, snow, or seismic acceleration. It should be understood that the shape and arrangement of the flanges 240 can be varied in some implementations. For example, the number of flanges 240, the shape of the flanges 240, and the spacing between the flanges 240 can be varied in some implementations without departing from the scope of this disclosure.

Figure 2C:
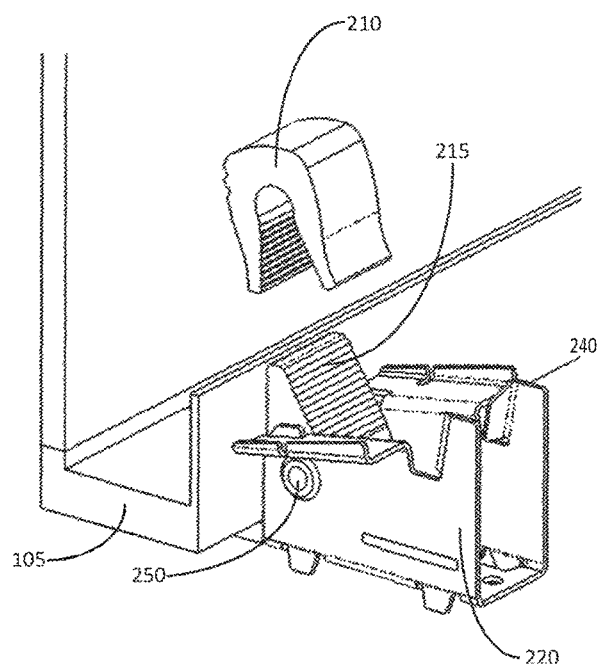
Figure 2D:
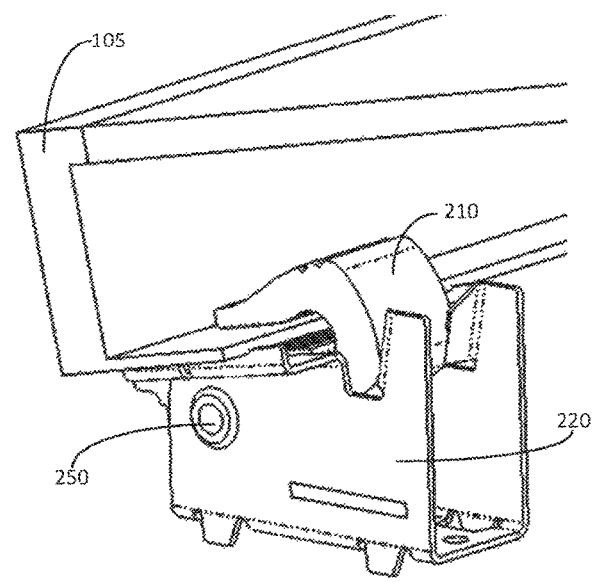

FIGS. 2C and 2D illustrate the installation of the low-side attachment mechanism 200. As shown in FIG. 2A, an edge of the solar module 105 is placed on the bracket 220, adjacent to the seat 215, while the clip 210 remains unattached to the seat 215. The clip 210 is then attached to the seat 215 by moving the clip 210 in a downward direction relative to its position in FIG. 2C. The seat 215 can include a seat surface 217, which may include a serration pattern. The serration pattern of the clip 210 can engage with the serration pattern of the seat surface 217 of the seat 215 to facilitate attachment of the clip 210 to the seat 215. Then, the solar module 105, the seat 215, and the clip 210 are all rotated together within the bracket 220 about the hinge 250. The result of this step is shown in FIG. 2D (as well as FIG. 2A). In its installed position, the connection geometry of the low-side attachment mechanism 200 causes the solar module 105 to be pressed against the seat 215 and bracket 220, further securing the solar module 105 to the low-side attachment mechanism 200.

In some implementations, the solar module 105 can be uninstalled by reversing the steps described above. For example, the solar module 105 can be rotated back to the position shown in FIG. 2C. In that position, the weight of the solar module 105 is primarily supported by the bracket 220, rather than by the seat 215 or the clip 210, and the flanges 240 are not applying a preload to the solar module flange 230. As a result, the clip 210 can easily be removed from the seat 215, thereby releasing the solar module 105 from the low-side attachment mechanism 200. Thus, installation and removal of the low-side attachment mechanism 200 can be accomplished without the use of any tools. In some implementations, the low-side attachment mechanism 200 can be reused in this manner any number of times. It should also be understood that the low-side attachment mechanism 200 can be used to support the solar module 105 at any point along the edge of the solar module 105 in the manner described above. In some implementations, any number of low-side attachment mechanisms 200 can be secured to the same edge of the solar module 105.

Figure 3B:
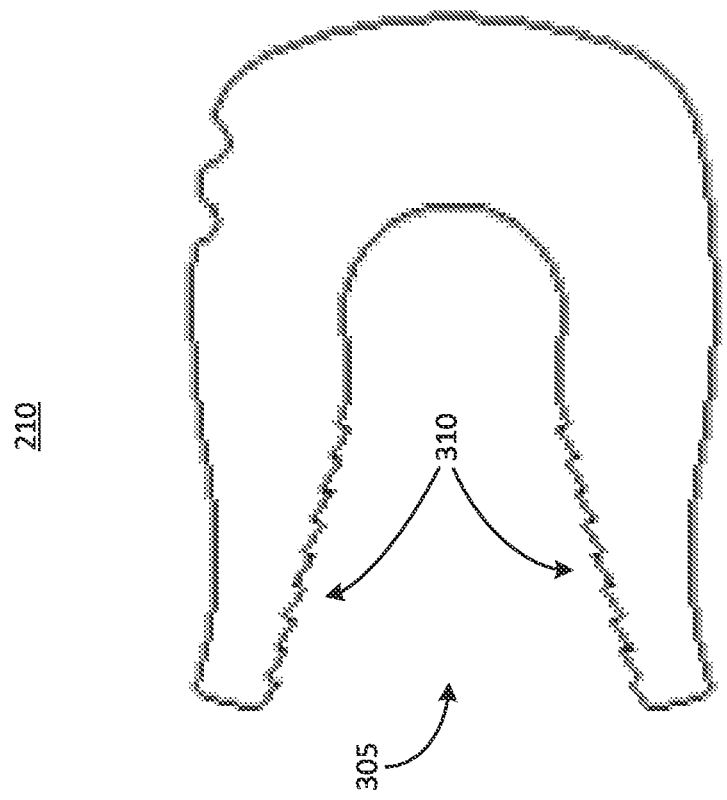
FIGS. 3A and 3B show various views of a clip included in the low-side attachment mechanism of FIGS. 2A-2D, according to an illustrative implementation.
Figure 3A:
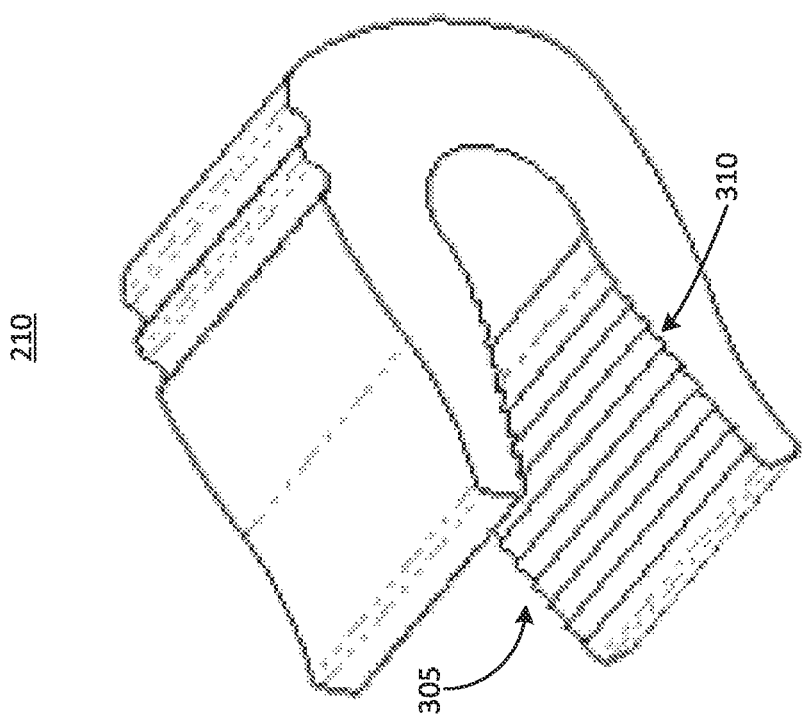

FIGS. 3A and 3B show various views of the clip 210 included in the low-side attachment mechanism 200 of FIGS. 2A-2D, according to an illustrative implementation. As shown, the clip 210 includes an opening 305 with opposing surfaces having a serration pattern 310. In some implementations, the serration pattern 310 of the clip 210 can engage with the serration pattern of the seat surface 217 of the seat 215. In some implementations, the opposing surfaces of the clip of the opening 305 can be arranged at an angle with respect to one another. Stated another way, the opposing surfaces of the opening 305 can be arranged such that they are not parallel. This arrangement can allow for the clip 210 to be used with solar modules 105 of varying sizes. For example, as described above, the clip 210 can be configured to couple to the seat 215 at various positions along the length of the seat 215, and the angle formed by the opposing surfaces of the opening 305 can allow for the distance between the clip 210 and the seat 215 (i.e., the space in which the solar module 105 is clamped) to be varied at the various positions to accommodate solar modules 105 with flanges 230 of varying thicknesses and lengths.

In some implementations, the serrations 310 can be configured to facilitate secure attachment of the clip 210 to the seat 215. For example, the serrations 310 can help to prevent the clip from backing out and releasing the solar module 105 when the clip 210 is in its installed position. The serrations 310 also can help to ensure a reliable electrical connection between the clip 210 and the seat 215, thereby facilitating grounding and bonding. It should be understood that the number and particular shape of the serrations 310 shown in FIG. 3 is illustrative only. In some implementations, the clip 210 may include more or fewer serrations 310 than illustrated, and the shape of the serrations 310 may be varied, without departing from the scope of this disclosure. Similarly, the angle formed by the opposing surfaces that define the opening 305 also may be varied in some implementations.

Figure 4A:
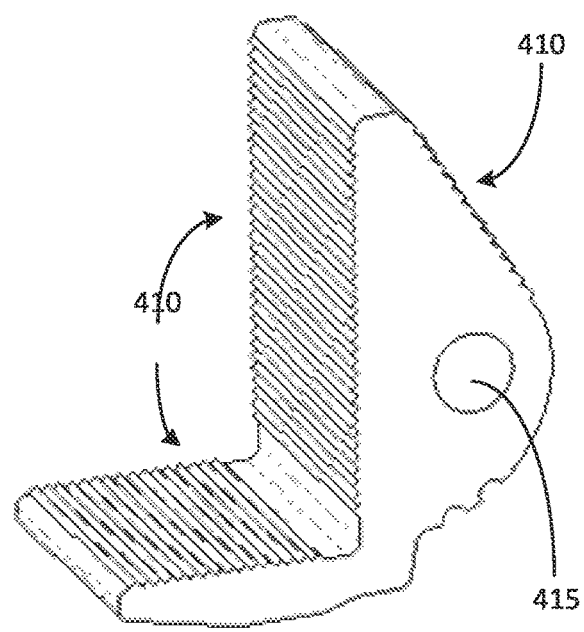
FIGS. 4A-4C show various views of a seat included in the low-side attachment mechanism of FIGS. 2A-2D, according to an illustrative implementation.
Figure 4B:
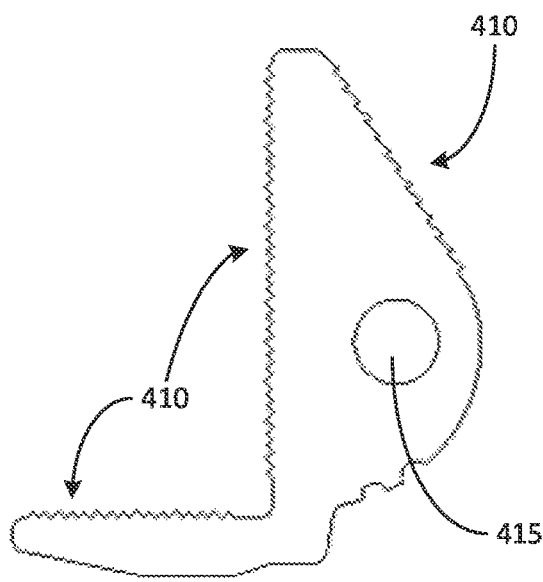
Figure 4C:
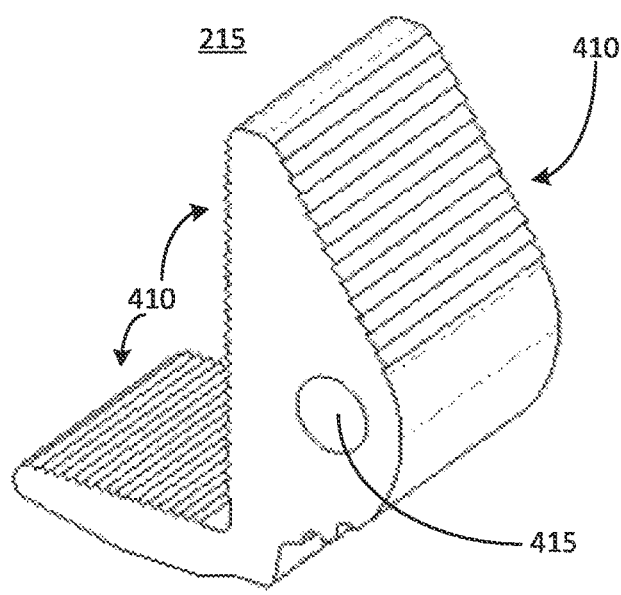

FIGS. 4A-4C show various views of the seat 215 included in the low-side attachment mechanism 200 of FIGS. 2A-2D, according to an illustrative implementation. As shown, the seat 215 includes opposing portions whose edges include serrations 410. In some implementations, the serrations 410 can be selected based on the shape of the serrations 310 of the clip 210 shown in FIGS. 3A and 3B. For example, the serrations 415 can be selected to have a shape that facilitates interlocking between the serrations 410 and the serrations 310. The seat 215 also includes an opening 415. The opening 415 can be formed through an entirety of the seat 210, such that a bolt or other component can be fit through the opening 415 to form the hinge 250 shown in FIGS. 2C and 2D. In some implementations, the seat 215 may include more or fewer serrations 410 than illustrated, and the shape of the serrations 410 may be varied, without departing from the scope of this disclosure. Similarly, the angle formed by the mating surfaces of the clip serrations 310 may be varied in some implementations.

Figure 5B:
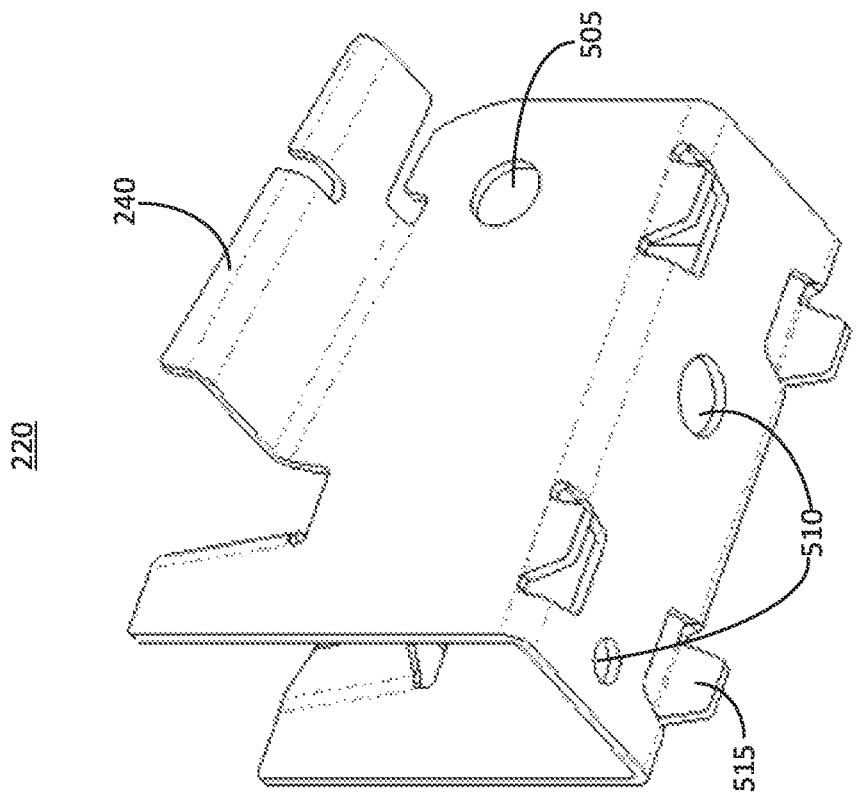
FIGS. 5A and 5B show various views of a bracket included in the low-side attachment mechanism of FIGS. 2A-2D, according to an illustrative implementation.
Figure 5A:
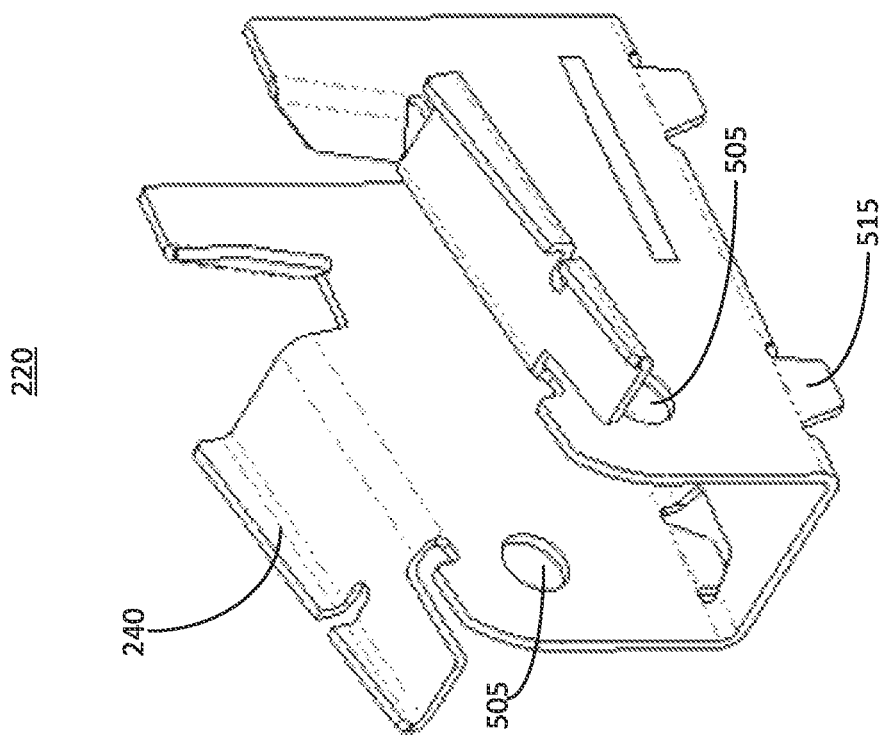

FIGS. 5A and 5B show various views of the bracket 220 included in the low-side attachment mechanism 200 of FIGS. 2A-2D, according to an illustrative implementation. As described above, the bracket 220 can include flanges 240, which can be configured to receive the solar module 105 when the solar module 105 is in an installed position in the low-side attachment mechanism 200. It should be understood that the upper edges of the bracket 220 to which the flanges 240 are coupled can be sloped at an angle selected based on a predetermined tilt angle for the solar module 105 to be supported by the bracket 220. Thus, in some implementations, the angle of the upper edge of the bracket 220 can be varied, and need not match the particular angle illustrated in FIGS. 5A and 5B. In some implementations, this angle can be about 10 degrees. In other implementations, this angle can be about five degrees, about 15 degrees, or about 20 degrees. In still other implementations, this angle can be zero degrees (i.e., the upper edges of the bracket 220 may not be sloped at all).

The bracket 220 also includes holes 505 formed through its side surfaces. In some implementations, the holes 505 can be configured to receive a bolt or other component to form the hinge 250 shown in FIGS. 2C and 2D. Generally, the position of the holes 505 can be selected based on a desired position of the hinge 250, and the holes 505 can be aligned with the holes 415 of the seat 215 shown in FIGS. 4A-4C. The bracket 220 also includes holes 510 through its bottom surface. In some implementations, the holes 510 can be used to facilitate attachment of the bracket 220 to the support member on which it is fixed (e.g., either of the first support members 110 shown in FIGS. 1A-1C). For example, the holes 510 can be configured to receive bolts that attach the bracket 220 to a support member. Feet 515 project outwards from the bottom surface of the bracket 220 to help facilitate alignment and to prevent rotation of the bracket 220 with respect to the support member on which it is fixed. In some implementations, the bracket 220 may have features that prevent the clip 210 from backing out of or separating from the seat 215. These features may interlock with the clip 210 or may provide a positive stop against the back of the clip 210.

Figure 6A:
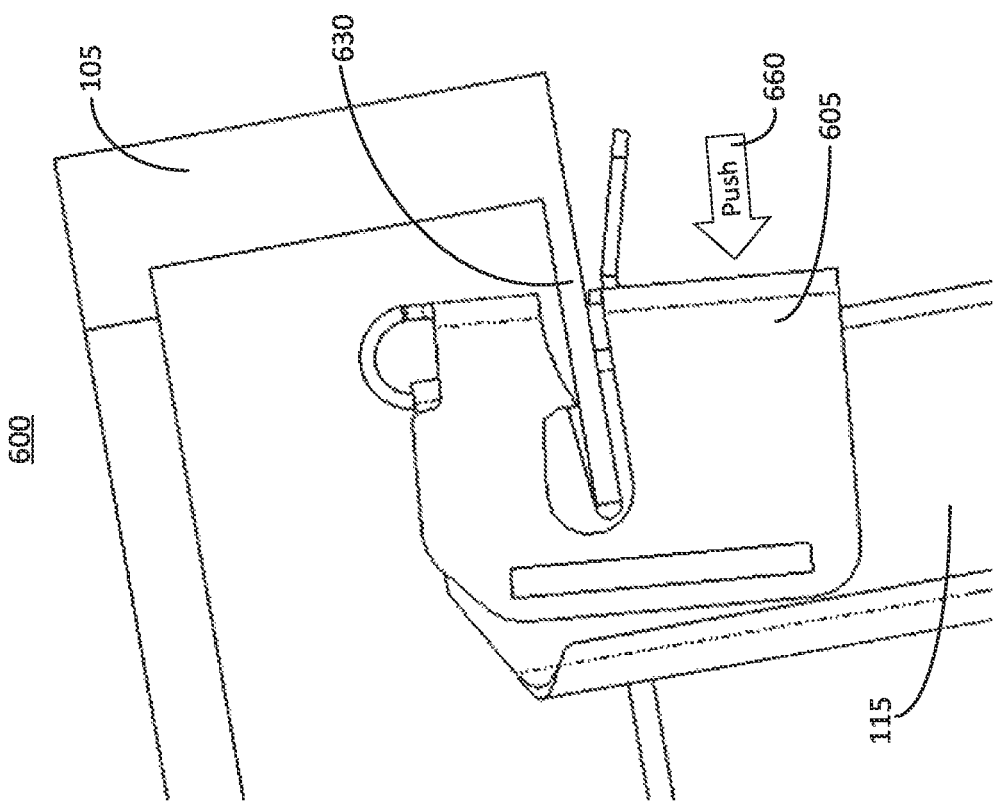
FIGS. 6A and 6B show various views of a high-side attachment mechanism that can be used in the system of FIGS. 1A-1C, according to an illustrative implementation.
Figure 6B:
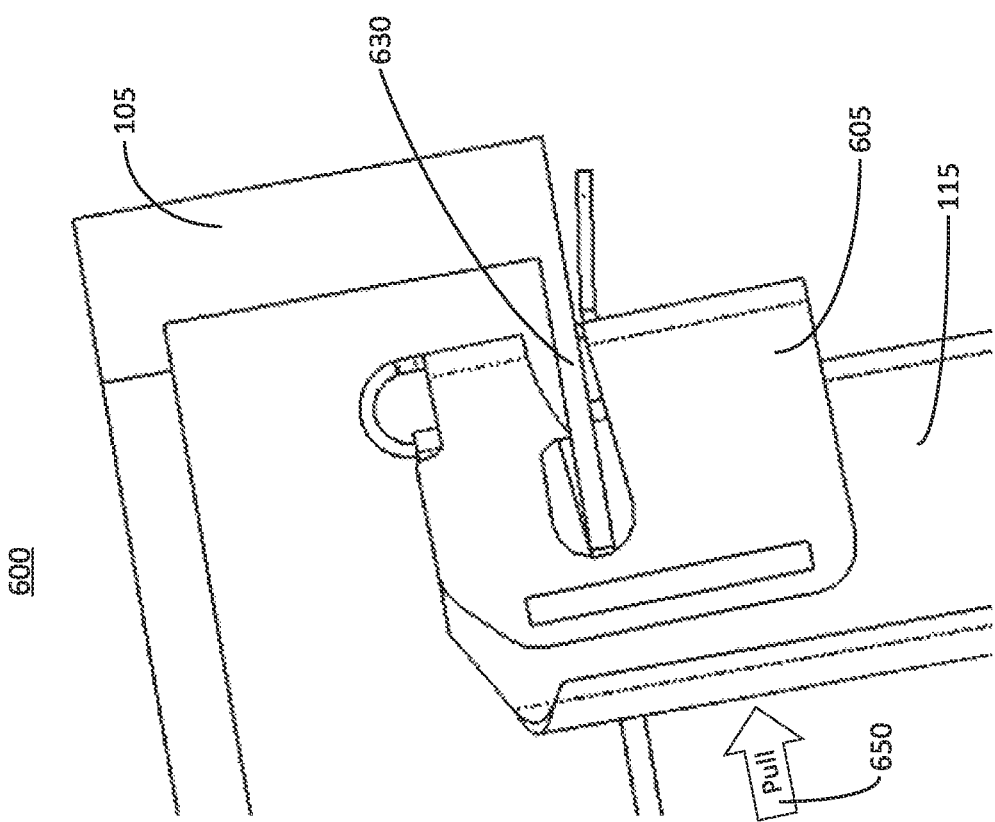

FIGS. 6A and 6B show various views of the high-side attachment mechanism 600 that can be used in the system 100 of FIGS. 1A-1C, according to an illustrative implementation. In some implementations, the high-side attachment mechanism 600 can be used to secure the solar module 105 at either of the attachment points 125 shown in FIGS. 1A-1C. Stated another way, the high-side attachment mechanism 600 can be used to secure the solar module 105 to an end of each second support member 115. The high-side attachment mechanism 600 includes a bracket 605 coupled to the second support member 115.

As shown, when installed, a flange 630 of the solar module 105 is secured in place by the bracket 605. More particularly, to secure the solar module 105 within the high-side attachment mechanism 600, a force is exerted on the bracket 605 in the direction of the arrow 650 to cause the bracket 605 to rotate into the rotational position shown in FIG. 6A. In this rotational position, locking teeth of the bracket 605 (illustrated and described below in connection with FIGS. 8A and 8B) grip the flange 630 of the solar module 105 to lock the solar module 105 in place, preventing the solar module 105 from backing out of the high-side attachment mechanism 600. In some implementations, the flange 630 may instead be a flange of the frame 107, rather than a flange of the solar module 105. To release the solar module 105 from the high-side attachment mechanism 600, a force is exerted on the bracket 605 in the direction of the arrow 660 to rotate the bracket 605 into the rotational position shown in FIG. 6B. In that rotational position, the teeth of the bracket 605 do not restrict the motion of the solar module 105, thereby allowing the solar module 105 to be safely and easily removed from the high-side attachment mechanism 600. In some implementations, the forces exerted on the bracket 605 for installation or removal can be delivered manually by a technician without the use of a tool. Furthermore, the locking and releasing of the solar module 105 within the high-side attachment mechanism 600 can be performed many times without causing damage to either the solar module 105 or the components of the high-side attachment mechanism 600.

In some implementations, the components of the high-side attachment mechanism 600 can be formed from electrically conductive materials. Such an arrangement can help to facilitate electrical bonding of the components as well as grounding of the solar module 105. For example, when the solar module 105 is installed in the high-side attachment mechanism 600, an electrical path can exist between the solar module 105, the bracket 605, and the second support member 115. In some implementations, a grounding wire can couple at least one of these components (e.g., the bracket 220 or the second support member 115) to ground. In some other implementations, an electrical connection also can exist between the second support member 115 and the first support member to which the second support member 115 is fixed. The first support member can in turn be electrically connected to ground. In some implementations, the materials chosen to form the components of the high-side attachment mechanism 600 can also be selected to have sufficient structural strength to support the weight of the solar module 105, as well as any pressure that may be exerted on the solar module 105, for example due to wind, snow, or seismic acceleration. In some implementations, the bracket 605 and the second support member 115 can be formed from a conductive and structurally strong material, such as steel or aluminum. In some implementations, portions of the bracket 605 or the second support member 115 can be formed from a different material selected to help avoid damaging the solar module 105. For example, the surfaces of the bracket 605 or the second support member 115 (or both) that are nearest to the solar module 105 can be coated with rubber or another soft material to reduce the likelihood that the solar module 105 will become damaged as a result of contact with these components.

Figure 7:
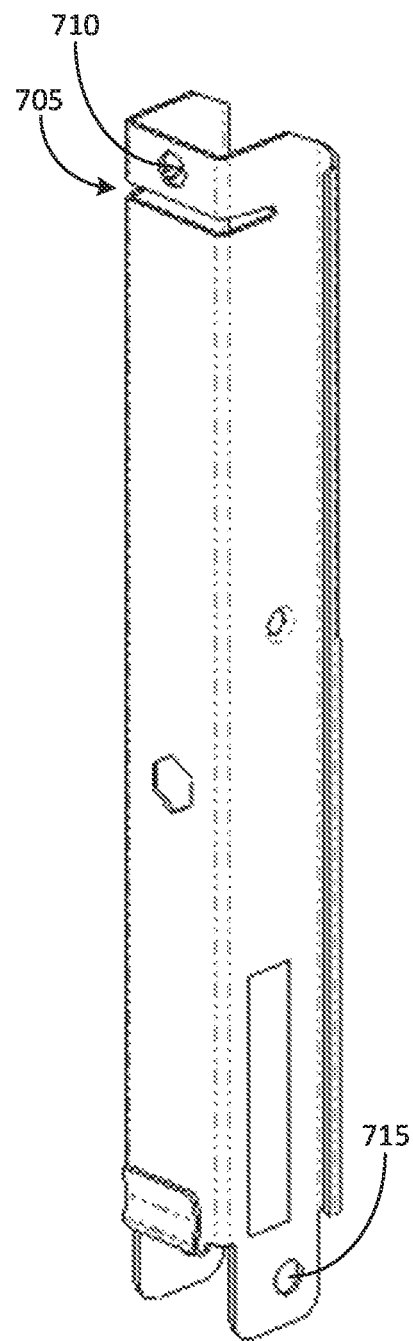
FIG. 7 shows a perspective view of a support member included in the high-side attachment mechanism of FIGS. 6A and 6B, according to an illustrative implementation.

FIG. 7 shows a perspective view of a support member 115 included in the high-side attachment mechanism 600 of FIGS. 6A and 6B, according to an illustrative implementation. As shown, the support member 115 includes a slot 705, which can be configured to receive the flange 630 of the solar module 105, as illustrated in FIGS. 6A and 6B. A hole 710 is positioned above the slot 705. In some implementations, the hole 710 can be configured to receive a mechanical fastener to couple the support member 115 to the bracket 605 to form the high-side attachment mechanism 600. The opposite end of the support member 115 includes holes 715, which can be configured to receive a mechanical fastener to join the support member 115 to a first support member 110, as illustrated in FIGS. 1A-1C.

FIGS. 8A and 8B show various views of the bracket 605 included in the high-side attachment mechanism 600 of FIGS. 6A and 6B, according to an illustrative implementation. The bracket 605 includes a slot 805 configured to receive the flange 630 of the solar module 105, as illustrated in FIGS. 6A and 6B. In some implementations, the slot 805 can be configured for alignment with the slot 705 of the support member 115 shown in FIG. 7. An upper edge of the slot 805 includes teeth 810. As shown in FIG. 6A, the teeth 810 can be configured to grip the solar module 105 when the high-side attachment mechanism 600 is in an installed position, thereby preventing the solar module 105 from sliding within or backing out of the slot 805. It should be understood that the particular shape and quantity of the teeth 810 may be different from that shown in FIGS. 8A and 8B. For example, the shape of the teeth 810 can be selected based on a shape or thickness of the solar module 105. The bracket 605 also includes a solar module locator tongue 815. The solar module locator tongue 815 can be configured to partially support the solar module 105 during installation or removal of the high-side attachment mechanism 600, which can help to reduce the likelihood of damaging the solar module 105 during the installation or removal process. The bracket 605 also includes a hole 820, which can be configured to receive a mechanical fastener to couple the bracket 605 to the support member 115 to form the high-side attachment mechanism 600. In some implementations, the upper edges of the bracket 605 can be formed in a rounded or hemmed shape that does not include sharp edges, in order to reduce the potential for causing damage to a backsheet of the solar module 105. In some implementations, various other edges, such as the upper edges of the support member 115, also can be formed in a rounded or hemmed shape for similar reasons.

Figure 9A:
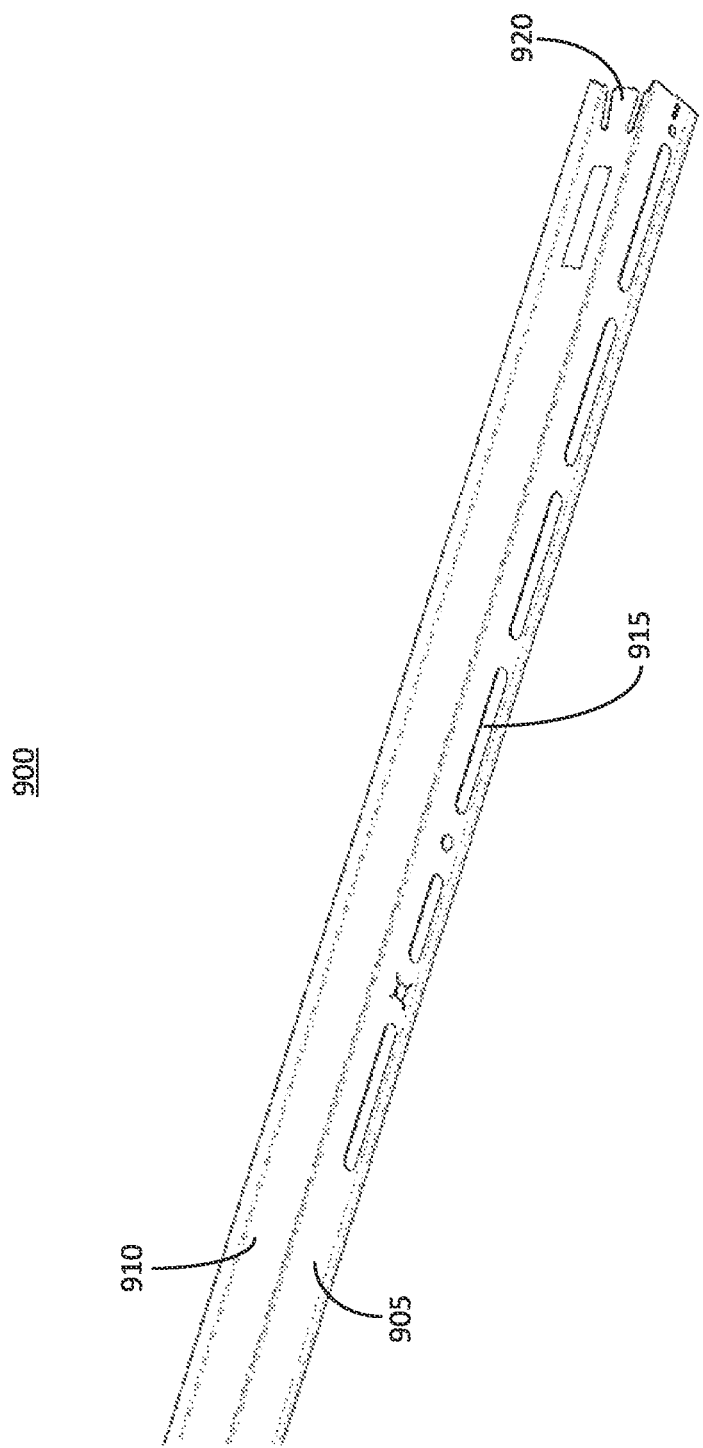
FIGS. 9A-9F show various views of ballast rails that can be used in connection with the system of FIGS. 1A-1C, according to an illustrative implementation.

FIGS. 9A-9F show various views of ballast rails that can be used in connection with the system of FIGS. 1A-1C, according to an illustrative implementation. FIG. 9A shows a perspective view of a portion of a ballast rail 900. The ballast rail 900 includes a ballast supporting surface 905 and a sidewall 910. The ballast supporting surface 905 can be coupled with the sidewall 910 along an edge of the ballast rail 900. The end of the ballast rail 900 can include one or more openings 915 as a well as a security tab 920. Although not depicted in FIG. 9A, it should be understood that the other end of the ballast rail 900 may also include openings 915 and a security tab 920. Thus, the ballast rail 900 can be symmetrical in some implementations.

In some implementations, the ballast rail 900 is formed from metal. For example, steel or aluminum may be used to form the ballast rail 900. In other implementations, a metal alloy may be used. Metal may be a suitable material due to its ability to provide structural integrity to the frame. Metal also can provide for an electrical path to earth ground through the ballast rail 900. Furthermore, due to its low cost and malleability, forming the ballast rail 900 from a metal can reduce the overall production cost and complexity of the ballast rail 900. For example, the ballast rail 900 can be formed from a flat sheet of metal. The sheet can be cut to the correct dimensions and can then be bent into the proper shape. Therefore, in some implementations, the ballast rail 900 can be formed from a single piece of material.

In some implementations, the ballast rail 900 can be mounted to structural members such as the first support members 110 shown in FIGS. 1A-1C. For example, the ballast rail 900 can be positioned such that the openings 915 are aligned with mounting holes on a desired first support member 110. In some implementations, one or more of the openings 915 may be substantially circular holes formed through the ballast supporting surface 905 of the ballast rail 900. In some implementations, one or more of the openings 915 may be slots having an elongated shape. In some implementations, the shape of one or more of the openings 915 may be different than that depicted in FIG. 9A. Bolts or other mechanical fasteners can be placed through the openings 915 and mounting holes to secure the ballast rail 900 to the first support member 110. Because there are many openings 915 along the length of the ballast rail 900, particular knowledge of the position of the mounting holes on the support structures is not required at the time of manufacturing. Rather, it can be assumed that the large number of openings 915 will provide adequate ability to reposition the ballast rail 900 such that it can be fastened to the desired support members at the installation site. Thus, the openings 915 simplify the manufacturing and installation process for the ballast rail 900.

Figure 9B:
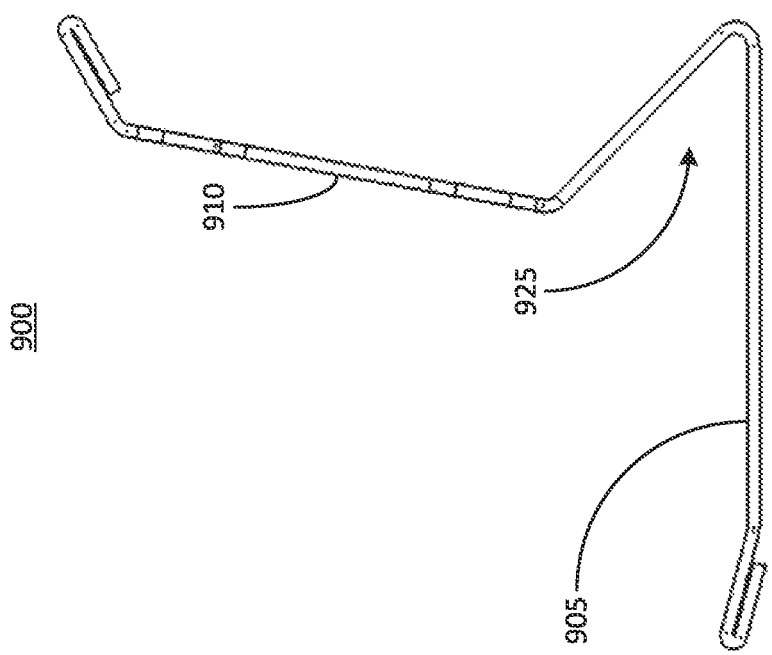

FIG. 9B shows a side view of the ballast rail 900. As shown, the ballast supporting surface 905 can be substantially parallel to the ground, a roof, or another mounting surface. The ballast supporting surface 905 can be configured to support at least a portion of a ballast block. For example, the ballast block can be any type or form of weight configured to exert a force on the ballast supporting surface 905 of the ballast rail 900. This weight can help to secure the ballast rail 900 and any underlying or mechanically coupled support structures (e.g., the first support members 110 and the second support members 115 of the system 100 shown in FIGS. 1A-1C) in a fixed location on the mounting surface. For example, the ballast block can help to prevent movement of the components of the system 100 due to wind, seismic forces, or any other force.

As shown in FIG. 9B, the sidewall 910 can extend away from the ballast supporting surface 905. The ballast rail 900 can also include an interlocking feature 925. The interlocking feature 925 can be or can include at least a portion of either or both of the ballast supporting surface 905 and the sidewall 910. For example, the interlocking feature 925 can include a juncture of the ballast supporting surface 905 and the sidewall 910. In some implementations, as shown in FIG. 9B, this juncture may form an angle of less than 90 degrees. In some other angles, the juncture may form a 90 degree angle or an angle of greater than 90 degrees. In some implementations, the side profile of the ballast rail 900, including the shape and angles of the ballast supporting surface 905, the sidewall 910, and the interlocking feature 925, can be selected to reduce stress on the ballast rail 900 caused by bending. Thus, the ballast rail 900 may have the ability to withstand high loads without permanent deformation of the ballast rail 900.

Figure 9C:
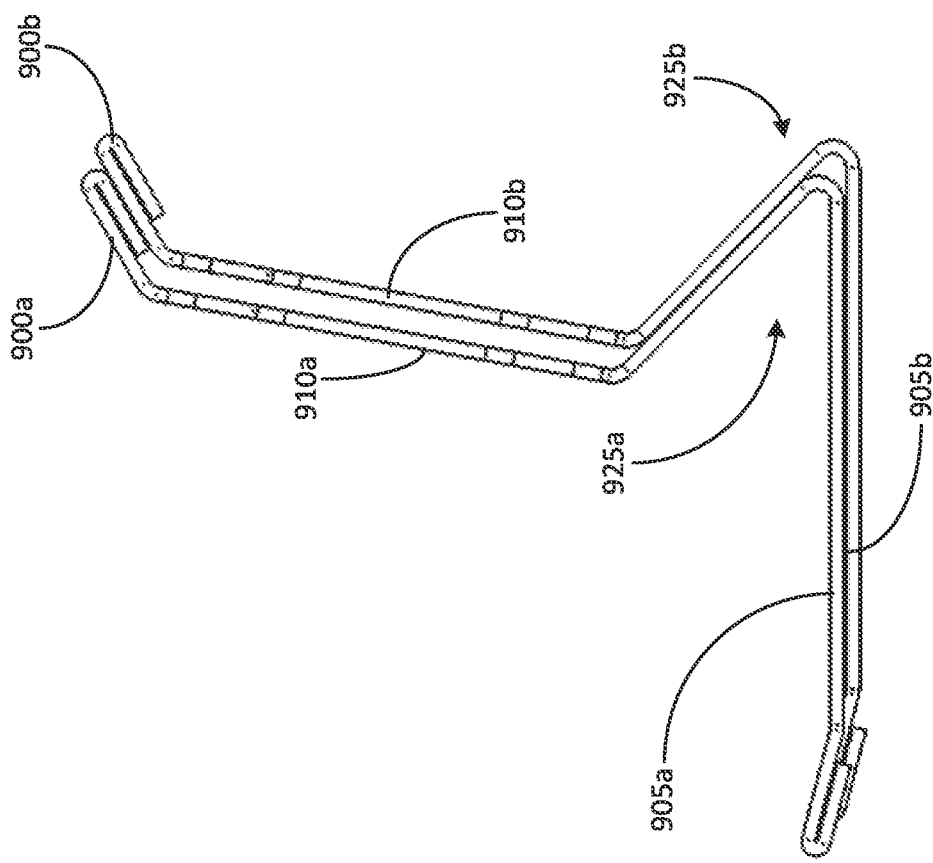

FIG. 9C shows a side view of two ballast rails 900a and 900b (generally referred to as ballast rails 900) arranged in an interlocking fashion. As shown, when interlocked, at least a portion of the ballast supporting surface 905a of the ballast rail 900a can be in contact with at least a portion of the ballast supporting surface 905b of the ballast rail 900b. In addition, the interlocking features 925a and 925b can interlock with one another. As a result, the two ballast rails 900a and 900b can together provide functionality similar to that of one continuous rail. This is further illustrated in FIG. 9D, which shows an exploded view of the system 100 of FIGS. 1A-1C, along with ballast rails 900a-900c. As shown, the ballast rails 900a-900c can all be arranged parallel with one another, and ballast rails 900 can partially overlap. For example, the portion of the ballast rail 900a that includes the openings 915a can overlap with the portion of the ballast rail 900b that includes the openings 915b. As a result, in some implementations the openings 915 of overlapping ballast rails 900 may also overlap one another. This arrangement can allow for a mechanical fastener such as the mechanical fastener 950 to be inserted through the openings 915a and 915b of both ballast rails 900a and 900b to couple both of the ballast rails 900a and 900b to the first support member 110a. The ballast rail 900c can overlap the other end of the ballast rail 900a in a similar manner. In some implementations, the ballast rails 900 can be mounted to the first support members 100 such that the ballast rails 900 extend in a direction perpendicular to a direction of the first support members 110. In some implementations, the ballast rails 900 can be positioned beneath any solar panel modules that may be installed in the system 100, such that the ballast rails 900 do not obstruct or shelter the solar panel modules from the sun.

As described above, the overlapping arrangement of the ballast rails 900a-900c can allow the ballast rails 900a-900c to function as a single ballast rail having a length longer than that of any the individual ballasts rail 900a-900c. In addition, the openings 915 can eliminate the need to precisely measure the lengths of the ballast rails 900 prior to assembly of the system 100. For example, the overall length of the overlapping ballast rails 900a-900c can be adjusted on site simply by adjusting the degree to which adjacent ballast rails 900 overlap. Thus, manufacturing and installation of the ballast rails can be simplified. In addition, a single ballast rail design, or a limited number of ballast rail designs, can be used to mount modules of many varying lengths in the system 100.

Figure 9D:
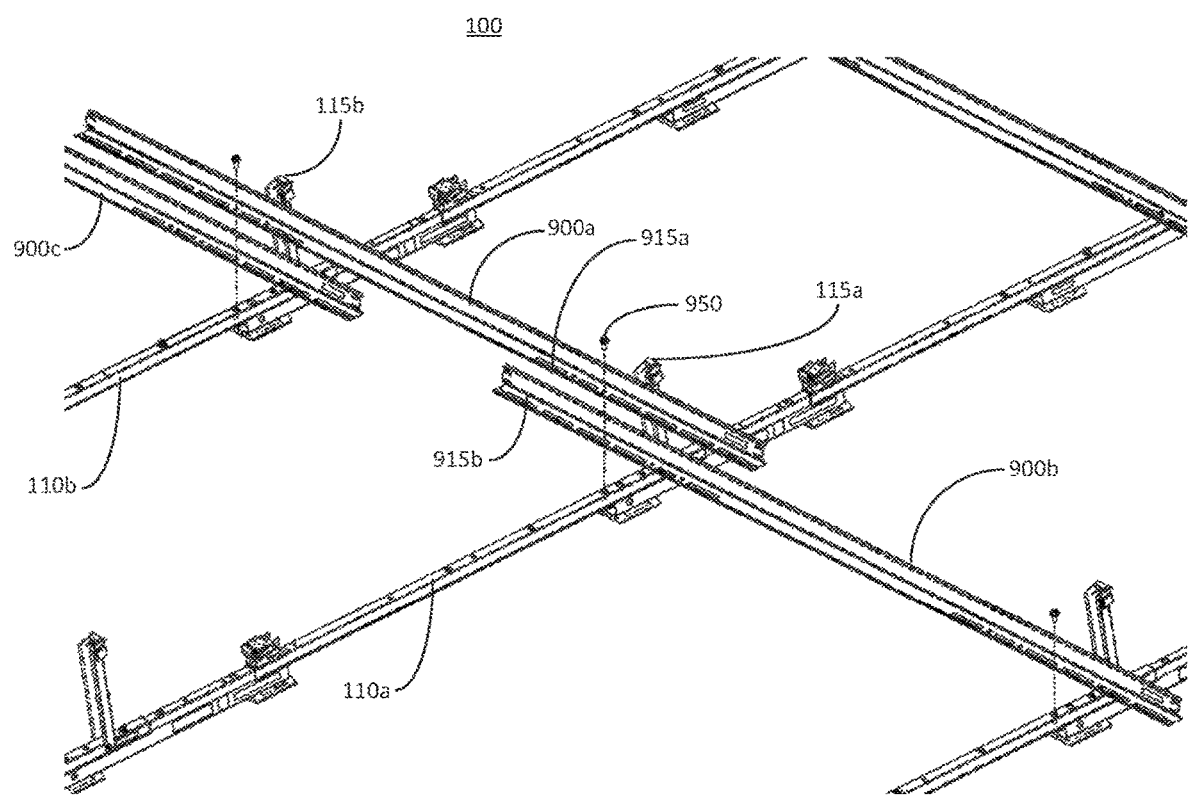
Figure 9E:
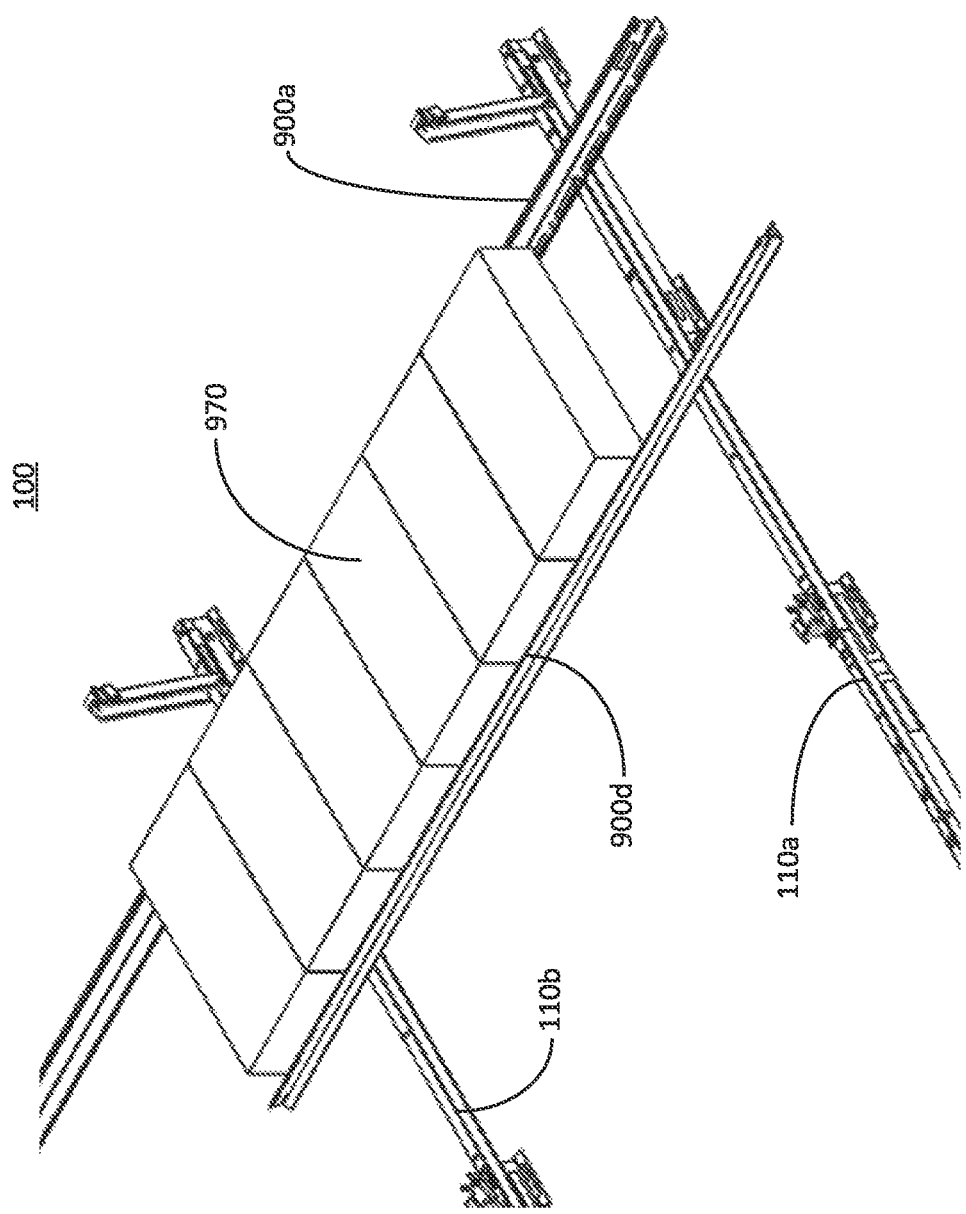

FIG. 9E shows the system 100 in an arrangement similar to that shown in FIG. 9D, but with the addition of a ballast rail 900d. The ballast rail 900d is coupled with the first support members 110a and 110b and extends in a direction parallel to that of the ballast rail 900a. However, the ballast rail 900d is spaced away from the ballast rail 900a so that the two are not in contact with one another. In addition, the ballast rail 900d is mounted in an orientation opposed to an orientation of the ballast rail 900a. For example, the ballast supporting surface 905a of the ballast rail 900a can extend outward from its sidewall 910a in a direction opposite the direction in which the ballast supporting surface 905d of the ballast rail 900d extends away from its sidewall 910d. Stated differently, the ballast supporting surface 905a of the ballast rail 900a can extend towards the ballast supporting surface 905d of the ballast rail 900d. As a result, the ballast supporting surface 905a can support a first side of the ballast block 970 and the ballast supporting surface 905d can support a second side of the ballast block 970 so that the fully weight of the ballast block 970 is supported by the ballast rails 900a and 900d. In some implementations, the ballast rails 900a and 900d together may also support additional ballast blocks similar to the ballast block 970. The ballast rails 900a and 900d also can be configured to easily support different sizes of ballast blocks 970. For example, simply by adjusting the spacing between the ballast blocks 900a and 900d (e.g., moving the ballast rail 900d closer to or farther from the ballast rail 900a), ballast blocks 970 having any dimensions can be accommodated.

Figure 9F:
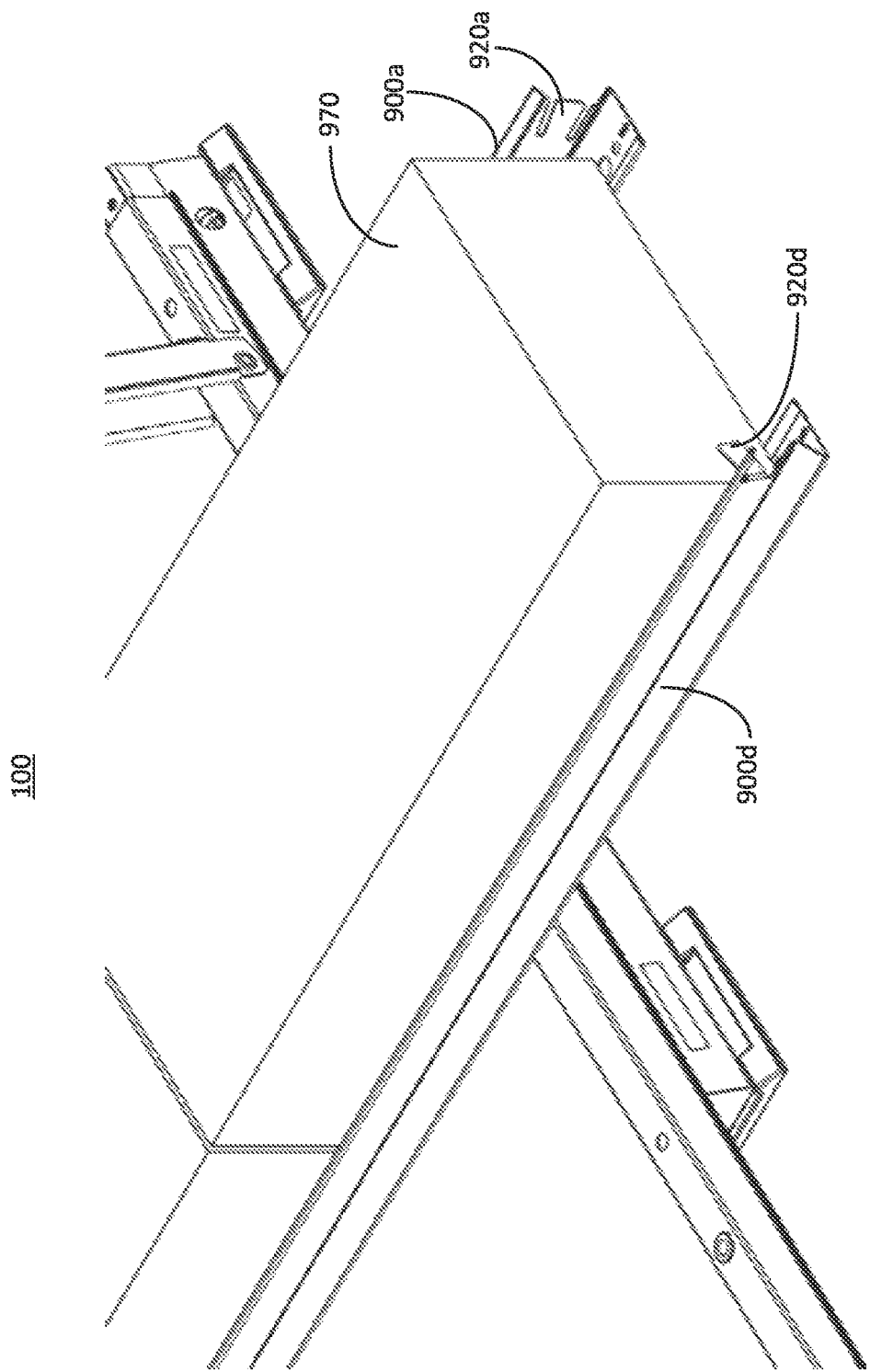

FIG. 9F shows an enlarged view of an end portion of the ballast rails 900a and 900d. As shown, both ballast rails 900a and 900d have a respective security tab 920a and 920d (generally referred to as security tabs 920). In some implementations, the security tabs 920 help to ensure that the ballast blocks 970 will not easily slide off of the ballast supporting surfaces 905a and 905d during use. For example, as shown in FIG. 9F, the security tab 920 can be bent at an angle of approximately 90 degrees so that they extend or protrude into the space between the ballast rail 900a and the ballast rail 900d. In FIG. 9F, the security tab 920d is shown in the bent position. The security tab 920a can also be bent into a similar position, however it is shown in its original position in FIG. 9F for illustrative purposes. In some implementations, after the ballast blocks have been installed at the installation site, a technician can bend the security tabs 920 at right angles with respect to their sidewalls 910a and 910d. The protruding security tabs 920 can then prevent the ballast blocks 970 from sliding off of the length of the ballast rails 900.

Various examples have been given for devices, systems and methods for mounting solar modules. As used herein, the term solar module refers to a complete, environmentally protected unit designed to generate power when exposed to sunlight and comprising one or more solar cells and, optionally, optics and/or other components (typically exclusive of a tracker). A solar cell is a photovoltaic device that generates electricity when exposed to light. However, some embodiments may be used for mounting solar modules or arrays of solar modules, where the term solar array refers to collection of modules mechanically fasten together, wired, and designed to provide a field-installable unit. Various embodiments may be used to mount any other suitable devices (e.g. mirrors, heat tubes, thermoelectric devices, optical devices, etc.).

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

The phrase "and/or," as used herein should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A method of mounting a framed solar module, the method comprising the steps of:
   coupling a seat to a bracket;
   aligning a flange of a framed solar module with the seat;
   moving a clip over the aligned flange and seat so that an opening of the clip receives the aligned flange and seat therein; and
   rotating the clip, flange, and seat about the bracket, so that a solar panel is at least partially supported by the bracket.

2. The method of claim 1, wherein the bracket comprises at least one bracket surface configured to support at least a portion of the solar module.

3. The method of claim 2, wherein the bracket comprises at least one flange extending away from the at least one bracket surface and configured to exert a force on the flange of the framed solar module.

4. The method of claim 3, wherein the at least one bracket surface comprises two bracket surfaces on opposing sides of the bracket and
   wherein the at least one flange comprises two flanges, each flange corresponding to and extending away from one of the two bracket surfaces.

5. The method of claim 1, wherein the bracket comprises at least one foot configured to prevent rotation of the bracket.

6. The method of claim 1 further comprising the step of coupling the bracket to a support member,
   wherein the support member extends along a mounting surface for supporting the framed solar module.

7. The method of claim 6, wherein the bracket comprises at least one bracket surface configured to support at least a portion of the solar panel thereon, the at least one bracket surface being sloped at a tilt angle relative to the mounting surface.

8. The method of claim 6, wherein the bracket comprises at least one foot configured to prevent rotation of the bracket with respect to the support member.

9. The method of claim 1, wherein the seat is coupled to the bracket by a hinge permitting the rotation of the clip, flange, and seat about the bracket.

10. The method of claim 1, wherein the seat comprises a seat surface, the seat surface being aligned with the flange of the framed solar module.

11. The method of claim 10, wherein the clip comprises a pair of opposing clip surfaces defining the opening of the clip therebetween.

12. The method of claim 11, wherein a first surface of the pair of opposing clip surfaces is configured to contact the flange of the framed solar module, and
   wherein a second surface of the pair of opposing clip surfaces is configured to contact the seat surface.

13. The method of claim 12, wherein the seat surface comprises a first serration pattern, and
   wherein the second surface of the pair of opposing clip surfaces comprises a second serration pattern configured to engage with the first serration pattern.

14. The method of claim 1, wherein the support member, the seat, the bracket, and the clip are formed from at least one electrically conductive material thereby defining a grounding path between the framed solar module and the support member.

15. An attachment mechanism for securing a framed solar module to a support structure, the attachment mechanism comprising:
   a support member configured to extend along a mounting surface, the support member forming at least a portion of the support structure;
   a bracket coupled with the support member;
   a seat rotatably coupled with the bracket and configured to support at least a portion of the framed solar module; and
   a clip having an opening configured to receive the seat and the at least a portion of the framed solar module supported by the seat therein,
   wherein the clip, the seat, and the at least a portion of the framed solar module supported by the seat are rotatable about the bracket.

16. The attachment mechanism of claim 15, wherein the seat comprises a seat surface configured to support the at least a portion of the framed solar module.

17. The attachment mechanism of claim 15, wherein the at least a portion of the framed solar module comprises a flange.

18. The attachment mechanism of claim 15, wherein the bracket comprises a bracket surface configured to support at least a portion of the framed solar module thereon, and
   wherein the bracket surface is sloped at a tilt angle relative to the mounting surface.

19. The attachment mechanism of claim 15, wherein the clip comprises a pair of opposing clip surfaces defining the opening therebetween,
   wherein a first surface of the pair of the opposing clip surfaces is configured to contact the at least a portion of the framed solar module, and
   wherein a second surface of the pair of the opposing clip surfaces is configured to contact the seat.

20. The attachment mechanism of claim 15, wherein the support member, the seat, the bracket, and the clip are formed from at least one electrically conductive materials thereby defining a grounding path between the framed solar module and the support member.

* * * * *